(12) United States Patent
Henry

(10) Patent No.: US 6,933,839 B2
(45) Date of Patent: Aug. 23, 2005

(54) VEHICLE SAFETY SYSTEM

(76) Inventor: John Junior Henry, 4115 Williston Rd., Minnetonka, MN (US) 55435

(*) Notice: Subject to any disclaimer, the term of this patent is extended or adjusted under 35 U.S.C. 154(b) by 126 days.

(21) Appl. No.: 10/439,918

(22) Filed: May 16, 2003

(65) Prior Publication Data

US 2004/0227646 A1 Nov. 18, 2004

(51) Int. Cl.⁷ .............................. B60Q 1/44; B60R 25/10
(52) U.S. Cl. ................ 340/479; 340/425.5; 340/426.18
(58) Field of Search ............................... 340/453, 438, 340/439, 479, 425.5, 539.1, 539.13, 539.17, 539.24, 426.18, 426.19, 426.2; 701/24, 29, 35

(56) References Cited

U.S. PATENT DOCUMENTS

| | | | |
|---|---|---|---|
| 4,085,317 A | 4/1978 | Mithoff | 362/72 |
| 4,319,308 A | 3/1982 | Ippoliti et al. | 362/106 |
| 4,559,516 A | 12/1985 | Schott et al. | 340/73 |
| 4,559,586 A | 12/1985 | Slarve | 362/106 |
| 4,760,373 A | 7/1988 | Reilly | 340/134 |
| 4,769,629 A | 9/1988 | Tigwell | 340/134 |
| 4,862,331 A | 8/1989 | Hanabusa | 362/106 |
| 4,891,736 A | 1/1990 | Gouda | 362/105 |
| 4,901,210 A | 2/1990 | Hanabusa | 362/106 |
| 4,956,752 A | 9/1990 | Foglietti | 362/72 |
| 5,040,099 A | 8/1991 | Harris | 362/72 |
| 5,111,181 A | 5/1992 | Priesemuth | 340/467 |
| 5,124,848 A | 6/1992 | Capilupi, Jr. | 359/861 |
| 5,157,610 A * | 10/1992 | Asano et al. | 701/32 |
| 5,207,500 A | 5/1993 | Rios et al. | 362/105 |
| 5,329,637 A | 7/1994 | Walker | 2/5 |
| 5,353,008 A | 10/1994 | Eikenberry et al. | 340/479 |
| 5,416,675 A | 5/1995 | DeBeaux | 362/106 |
| 5,477,209 A | 12/1995 | Benson, Jr. et al. | 340/479 |
| 5,704,707 A | 1/1998 | Gebelein et al. | 362/106 |
| 5,910,764 A | 6/1999 | Hayden | 340/479 |
| 5,921,674 A | 7/1999 | Koczi | 362/800 |
| 5,955,945 A | 9/1999 | Fuhrer | 340/479 |
| 5,978,972 A | 11/1999 | Stewart et al. | 2/422 |
| 6,097,287 A | 8/2000 | Lu | 340/479 |
| 6,304,804 B1 | 10/2001 | DeBoni | 340/476 |
| 6,348,859 B1 | 2/2002 | Baker | 340/479 |
| 6,356,833 B2 * | 3/2002 | Jeon | 701/93 |
| 6,406,168 B1 | 6/2002 | Whiting | 362/473 |
| 6,408,232 B1 * | 6/2002 | Cannon et al. | 701/29 |
| 6,711,495 B1 * | 3/2004 | Ukai et al. | 701/207 |

* cited by examiner

Primary Examiner—Donnie L. Crosland
(74) Attorney, Agent, or Firm—Kinney & Lange, P.A.

(57) ABSTRACT

A vehicle safety system used to enhance the safety of motorists by emitting warning signals from a remote unit. The vehicle safety system incorporates a local unit attached to an associated vehicle that detects the operating conditions of the associated vehicle and emits wireless transmissions of the operating conditions to the remote unit, which is removable and portable relative to the associated vehicle. Upon receiving the wireless transmissions, the remote unit produces warning signals based upon the wireless transmissions received.

20 Claims, 15 Drawing Sheets

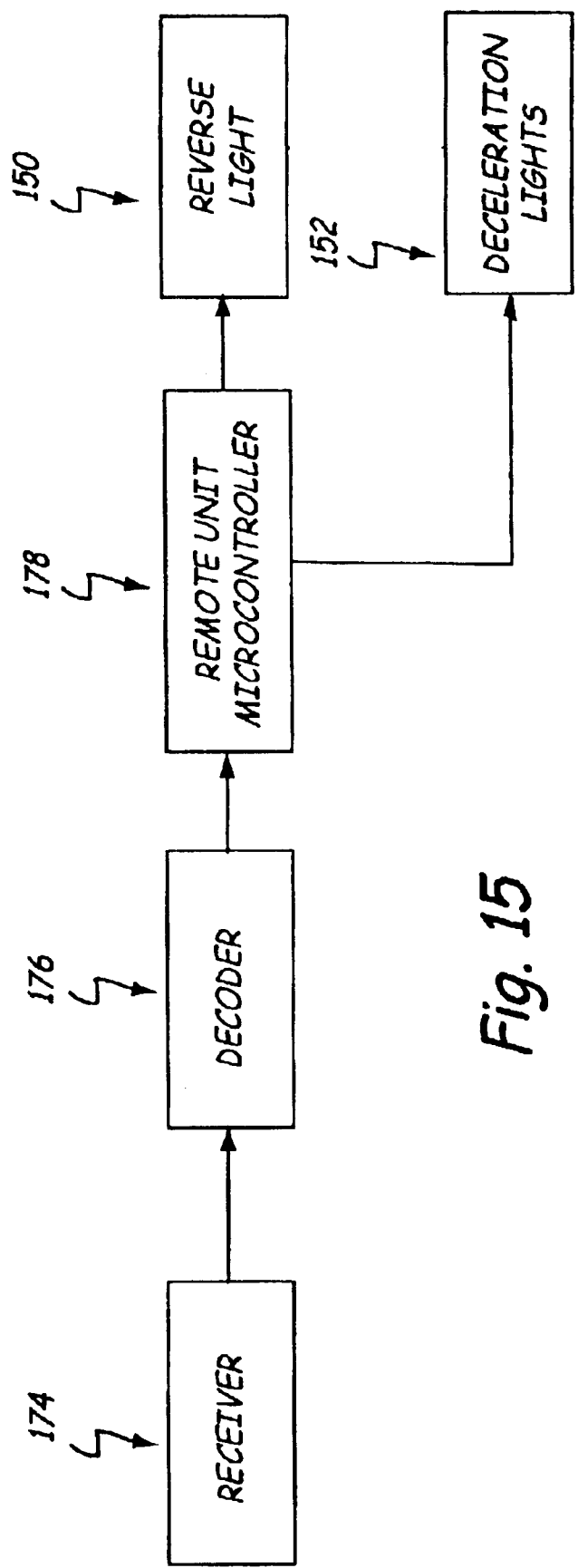

VEHICLE SAFETY SYSTEM

CROSS-REFERENCE TO RELATED APPLICATION(S)

None.

BACKGROUND OF THE INVENTION

The present invention relates to vehicle safety systems for motorists. In particular the present invention relates to a safety system for detecting operating conditions of an associated vehicle and for emitting corresponding visual and/or audible warning signals from portable locations.

Operation of motor vehicles, such as automobiles, trucks, personal motor vehicles, and motor boats, constantly places motorists at potential risk of property damages, injuries, and even fatalities. Due to the speed and power of motor vehicles, many dangerous situations exist that can result in collisions. For example, operators of personal motor vehicles, such as motorcycles, have inherent safety concerns normally not associated with other vehicles. In addition to the common hazards of minimal collision protection, a danger that is becoming more common with newer motorcycles is that, even without braking, they can decelerate very rapidly, almost as fast as braking itself. Recent models of motorcycles can decelerate as much as three times as fast as a car. This presents a dangerous situation because the brakes are not used. When braking, a motorcycle's tail brake light will illuminate to warn following traffic that the motorcycle is braking. However, if a motorcycle rapidly decelerates without braking, the brake light will not illuminate to warn others that the motorcycle is slowing down. Therefore, following traffic are not provided adequate warning of the deceleration.

Motorists are also placed in dangerous situations when they leave their vehicles at night. If a motorist pulls to the side of a road at night and leaves his or her motorcycle on the side of the road, traffic will only be able to see the lights of the motorcycle. The motorist will not be visible if he or she is too far from the lights of the motorcycle. Oncoming traffic will have little or no warning of the location of the motorist, and therefore, could accidentally hit the motorist.

Another hazardous condition occurs with the use of towed trailers. Trailers typically obstruct the view of the tail lights of the towing motor vehicles, hindering their view by following traffic. If a towing motor vehicle brakes or activates a turn signal with obstructed tail lights, the following traffic may not be able to observe the action. This could result in dangerous and expensive collisions. Moreover, not all trailers include built-in tail lights that directly hook into the towing vehicles tail light system via wire cables. As such, following traffic have little or no warning when the towing vehicle suddenly slows down or prepares to turn.

Additionally, motor boats do not have braking systems for slowing down. Correspondingly, motor boats do not have brake lights to warn following boaters if the motor boat is slowing down. If a motor boat rapidly decelerates, following boaters will have little warning to avoid potentially dangerous and expensive collisions.

There is a continuing need for safety devices that wain other motorists of potentially hazardous situations to avoid vehicular collisions. With the number of motorists increasing annually, greater means of providing adequate warnings are required.

BRIEF SUMMARY OF THE INVENTION

The present invention is a vehicle safety system used to enhance the safety of motorists, which includes a local unit attached to an associated motor vehicle and one or more remote units portable relative to the motor vehicle. The local unit detects operating conditions of the associated vehicle and emits wireless transmissions based upon the operating conditions detected. Such operating conditions may include activation of a braking system, deceleration, activation of a turn signal, and reverse operation (i.e. backing up). The remote units receive the wireless transmissions and produce warning signals based upon the wireless transmissions received. As such, the remote units act as a wireless devices for producing visible and/or audible warnings based upon the various operating conditions detected.

The vehicle safety system of the present invention may be used with a variety of motor vehicles such as motorcycles, snowmobiles, personal water craft, towing motor vehicle, and motor boats. In a first embodiment, the present invention may be used with personal motor vehicles such as motorcycles, snowmobiles, and personal water craft. The local unit is connected to an electrical system and a brake light system of the personal motor vehicle. With this arrangement, the local unit is capable of detecting operating conditions of the personal motor vehicle, such as an operation of the braking system, deceleration, and a reverse operation. Upon detecting these operating conditions, the local unit emits wireless transmissions corresponding to the operating conditions detected.

The remote unit is portable relative to the personal motor vehicle and may be secured on the rear surface of a helmet, on the back side of a safety jacket, or on any other suitable location. The remote unit receives the wireless transmissions emitted from the local unit regarding the operating conditions of the personal motor vehicle and produces corresponding warning signals. This provides additional visible and/or audible warnings to enhance the safety of the motorist of the personal motor vehicle.

In a second embodiment, the present invention may be used with a towing motor vehicle and a towed trailer. The local unit is connected to an electrical system, a brake light system, a reverse light system, and a turn signal light system of the towing motor vehicle. With this arrangement, the local unit is capable of detecting operating conditions of the towing motor vehicle, such as activation of the braking system, deceleration, reverse operation, and activation of the turning signals. Upon detecting these operating conditions, the local unit emits wireless transmissions corresponding to the operating conditions detected.

Two or more remote units are attached to the rear side of the trailer, functioning as wireless tail lights. The remote units receive the wireless transmissions emitted from the local unit regarding the operating conditions of the towing motor vehicle and produce corresponding warning signals. Additionally, the remote units may be designated as either a left remote unit or a right remote unit, allowing the remote units to function as left and right turn signals. This second embodiment of the present invention provides portable tail lights for towed trailers, which typically obstruct the tail lights of the towing vehicle.

In a third embodiment, the present invention maybe used with a motor boat. The local unit is attached to the motor boat and connected to an electrical source and a gear control circuit of the motor boat. With this arrangement, the local unit is capable of detecting operating conditions of the motor boat, such as deceleration and a reverse operation. Upon detecting these operating conditions, the local unit emits wireless transmissions corresponding to the operating conditions detected.

The remote unit, which may also mounted to the motor boat and connected to the electrical source of the motor boat, receives the wireless transmissions emitted from the local unit regarding the operating conditions of the motor boat and produces corresponding warning signals. As such, the remote unit acts as a warning light for when the motor boat is decelerating or backing up, enhancing the safety of boaters in the area.

BRIEF DESCRIPTION OF THE DRAWINGS

FIG. 15 is a block diagram of the remote unit of the third embodiment of the present invention.

DETAILED DESCRIPTION

Figure 1:
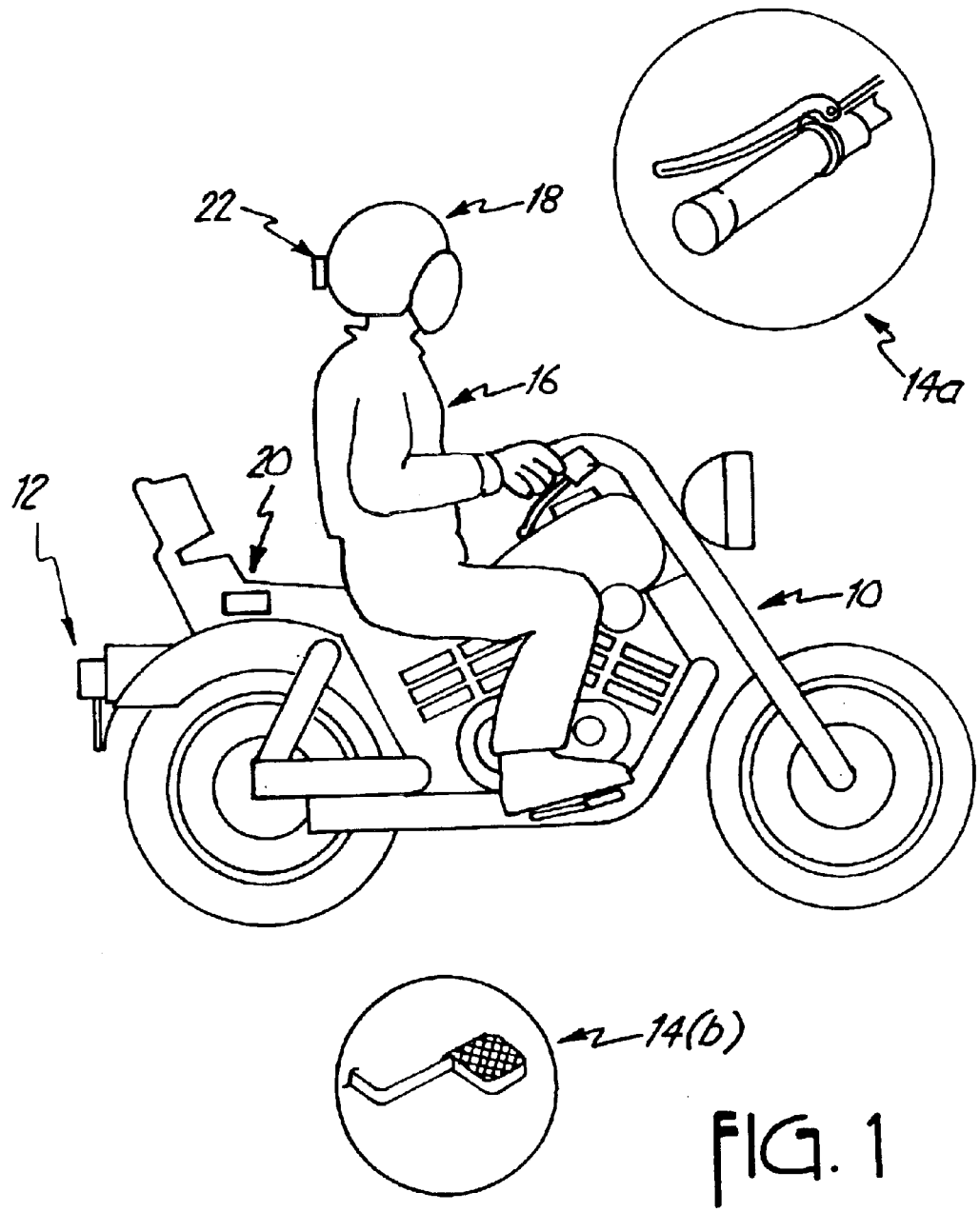
FIG. 1 is an illustration of the first embodiment of the present invention in use.

FIG. 1 is an illustration of a first embodiment of the present invention in use and includes motorcycle 10, motorcycle tail light 12, motorcycle brakes 14, motorist 16, helmet 18, local unit of present invention 20, and remote unit of present invention 22. The first embodiment of the present invention is not intended to be limited to use with motorcycles, and may be used with a variety of other personal motor vehicles, such as snowmobiles and personal water craft.

FIG. 1 additionally illustrates many features of a vehicle safety system described in U.S. Pat. No. 6,529,126, entitled "Safety Helmet System", which was invented by current Applicant, and is incorporated herein by reference.

Motorcycle 10 is a conventional motorcycle and includes tail light 12 and brakes 14. Tail light 12 is a standard motorcycle tail light and brakes 14 are standard motorcycle brakes that control a standard motorcycle braking system. Hand lever brake 14a is a standard motorcycle hand operated lever brake, and foot pedal brake 14b is a standard motorcycle foot operated pedal brake. An operation of brakes 14 refers to an operation of either hand lever brake 14a or foot pedal brake 14b.

Local unit 20 is attached directly to motorcycle 10. Motorist 16 sits atop motorcycle 10 and helmet 18 is worn by motorist 16. Remote unit 22 is attached to a rear surface of helmet 18 and is located at a vertically higher position than tail light 12. While remote unit 22 is illustrated as being attached to the rear surface of helmet 18, the present invention is not intended to be limited as such. Remote unit 22 is portable relative to motorcycle 10 and may be attached to any other suitable location. For example, remote unit 22 may be attached on the back side of a safety jacket adorned by motorist 16.

When local unit 20 detects operating conditions regarding motorcycle 10, such as activation of brakes 14, deceleration, a reverse operation, movement of motorcycle 10 when motorcycle 10 is not running, or when the engine of motorcycle 10 reaches certain RPM (rotations-per-minute) levels, local unit 20 emits wireless transmissions corresponding to the operating conditions detected. Remote unit 22 then receives the wireless transmissions and produces corresponding warning signals. These warning signals provide visual and/or audible warnings to reduce danger to motorist 16. The types of warning signals emitted by remote unit 22 depend upon the wireless transmissions emitted by local unit 20, which correspondingly depend upon the operating conditions local unit 20 detects.

A first type of warning signal is produced if brakes 14 are activated. When motorcycle 10 is braking, local unit 20 detects this and emits corresponding wireless transmissions to remote unit 22. Remote unit 22 then receives the wireless transmissions and produces a continuous brake light from rear side of helmet 18 to warn following traffic that motorcycle 10 is braking. This provides an additional brake light to enhance safety to motorist 16. When attached to the rear surface of helmet 18, the elevated position of remote unit 22, relative to tail light 12, also reduces danger to motorist 16 because elevated brake lights provide more notice to following traffic than brake lights at a lower elevation of tail light 12.

A second type of warning signal is produced if motorcycle 10 decelerates. When motorcycle 10 is decelerates, local unit 20 detects this and emits corresponding wireless transmissions to remote unit 22. Remote unit 22 then receives the wireless transmissions and flashes a warning light from rear side of helmet 18 to warn following traffic that motorcycle 10 is decelerating. This reduces danger to motorist 16 by providing a visible warning to following traffic that motorcycle 10 is decelerating. Preferably, the braking warning signal overrides the deceleration warning signal. When brakes 14 of motorcycle 10 are activated, remote unit 22 emits a continuous brake light, despite the fact that motorcycle 10 will also be decelerating. The deceleration warning signal is used when motorcycle 10 rapidly decelerates without an activation of brakes 14, as often occurs with newer motorcycles.

A third type of warning signal is produced if motorcycle 10 is in a reverse operation (i.e. backing up), which typically occurs by motorist 16 manually backing up motorcycle 10. When motorcycle 10 backs up, local unit 20 detects this and produces a reverse operation light from rear side of helmet 18 to warn others that motorcycle 10 is backing up.

Typically, motorcycles are not equipped with reverse operation lights. Remote unit 22 provides an elevated reverse operation light to enhance the safety of motorist 16 while backing up.

A fourth type of warning signal is a theft deterrent warning produced if motorcycle 10 is moved while not running. If motorcycle 10 is not running and is moved, local unit 20 detects this and directly outputs a signal to a horn (not shown) of motorcycle 10, providing an audible alarm to deter theft. Additionally, local unit 20 may emit corresponding wireless transmissions to remote unit 22. Remote unit 22 then receives the wireless transmissions and produces visual and/or audible warning signals to provide notice to motorist 16 that motorcycle 10 is being moved.

A fifth type of warning signal is produced if motorist 16 is away from motorcycle 10. If motorist 16 is wearing helmet 18 while away from motorcycle 10, remote unit 22 itself detects this and flashes another warning light to allow others to see motorist 16 while away from motorcycle 10. This reduces danger to motorist 16 in poorly lit locations by providing a visible warning to others of the location of motorist 16.

A sixth type of warning signal is produced if the engine of motorcycle 10 reaches preselected RPMs corresponding to shift points. Shift points are customizable, preprogrammed RPM levels designating points when motorcycle 10 should be switched to a higher or lower gear. If the engine of motorcycle 10 reaches an RPM level corresponding to a shift point, local unit 20 detects this and emits corresponding wireless transmissions to remote unit 22. Remote unit 22 then receives the wireless transmissions and emits audible warning signals. This provides notice to motorist 16 that motorcycle 10 has reached a shift point so that motorist 16 can shift gears. With this feature, motorist 16 is notified of the need to shift without having to look at a visual shift light or RPM gauge on a dash display of motorcycle 10, allowing motorist 16 to continuously focus on driving.

Local unit 20 and remote unit 22 enhance safety to motorist 16 by detecting operating conditions of motorcycle 10 and producing corresponding warning signals. Moreover, the portability of remote unit 22 allows the warning signals to be produced from any desired location. These benefits enhance the safety to motorist 16 and minimize vehicle-related accidents.

Figure 2:
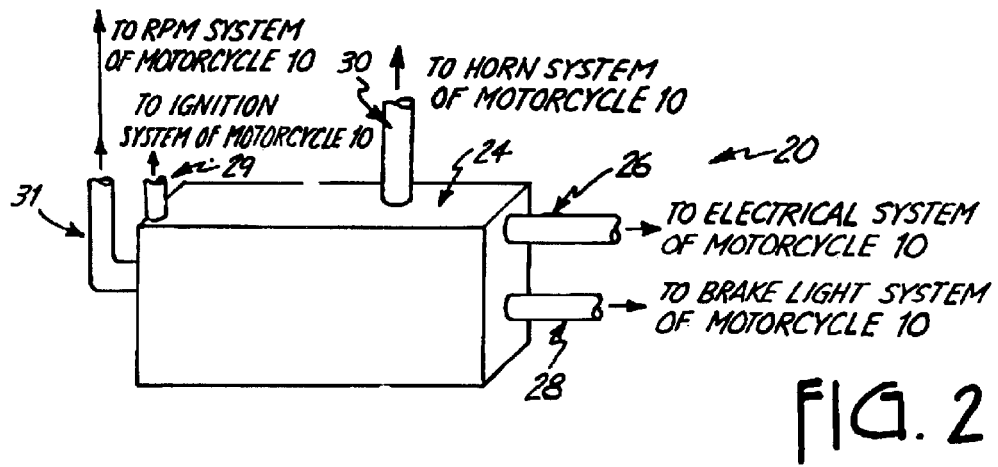
FIG. 2 is a perspective view of the local unit of the first embodiment of the present invention.
Figure 3:
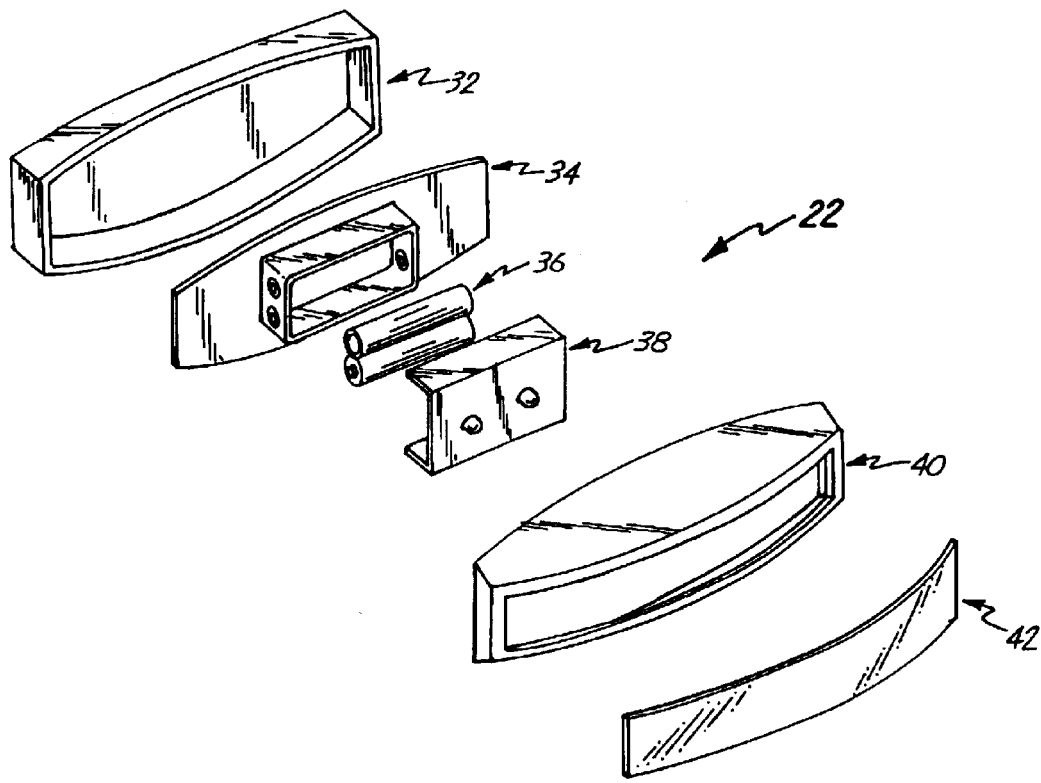
FIG. 3 is an exploded view of the remote unit of the first embodiment of the present invention.

FIGS. 2 and 3 illustrate local unit 20 and remote unit 22 of the present invention. FIG. 2 is a perspective view of external elements associated with local unit 20 including local unit casing 24, battery connection 26, brake light connection 28, ignition connection 29, horn connection 30, and RPM connection 31. Local unit casing 24 encompasses and provides protection for local unit 20. Battery connection 26 has a first end extending into local unit casing 24 and a second end connecting to an electrical system of motorcycle 10. The electrical system of motorcycle 10 is a standard motorcycle battery-powered system. As such, battery connection 26 provides local unit 20 with electrical power.

Brake light connection 28 has a first end extending into local unit casing 24 and a second end connecting to a brake light system of motorcycle 10. The brake light system of motorcycle 10 is a standard motorcycle brake-light circuit, which directly connects to tail light 12 and provides tail light 12 with electrical current when brakes 14 are activated. Brake light connection 28 allows local unit 20 to monitor the brake light system of motorcycle 10 for detecting an activation of brakes 14.

Ignition connection 29 has a first end extending into local unit casing 24 and a second end connecting to an ignition switch circuit of motorcycle 10. The ignition switch of motorcycle 10 is a standard motorcycle ignition switch circuit, wherein the ignition switch closes when motorcycle 10 is started up, allowing a current to run through the ignition switch circuit. Ignition connection 29 allows local unit 20 to monitor the state of the ignition switch of motorcycle 10 for detecting when motorcycle 10 is running. Alternatively, ignition connection 29 may detect other parameters related to whether motorcycle 10 is running.

Horn connection 30 has a first end extending into local unit casing 24 and a second end connecting to a horn system of motorcycle 10. The horn system of motorcycle 10 is a standard horn circuit, which sends an electrical current to a transducer when motorist 16 activates the horn of motorcycle 10. Horn connection 30 allows local unit 20 to directly output an electrical current to the horn system of motorcycle 10 for activating the horn.

RPM connection 31 has a first end extending into local unit casing 24 and a second end connecting to an RPM monitoring system of motorcycle 10. The RPM monitoring system of motorcycle 10 is a standard RPM monitoring circuit, which measures the RPMs of the engine of motorcycle 10. RPM connection 31 allows local unit 20 to monitor the RPMs of the engine of motorcycle 10 for allowing local unit 20 to detect when the engine of motorcycle 10 reaches RPM levels corresponding to preselected shift points.

Alternatively, RPM connection 31 may have a second end connecting to a power circuit from the alternator of motorcycle 10 for monitoring the RPMs based upon the current from the alternator of motorcycle 10. The RPMs of the engine of motorcycle 10 are proportional to the amount of current produced from the alternator of motorcycle 10. As such, RPM connection 31 may allow local unit 20 to similarly monitor the RPMs of the engine of motorcycle 10 for allowing local unit 20 to detect when the engine of motorcycle 10 reaches RPM levels corresponding to preselected shift points.

Local unit 20 is a compact and effective device for detecting operating conditions of motorcycle 10 and for emitting corresponding wireless transmissions to remote unit 22. The detection and wireless transmissions allow remote unit 22 to provide warning signals to protect motorist 16.

FIG. 3 is an exploded view of remote unit 22 including remote unit base 32, internal circuitry 34, battery 36, light emitting diode (LED) display 38, remote unit casing 40, and translucent cover 42. Remote unit base 32, is the portion of remote unit 22 that is attached to the rear surface of helmet 18 in FIG. 1. Remote unit base 32 may be attached to an intended surface by any conventional means, such as fasteners, adhesives, and magnets.

Internal circuitry 34 is attached inside remote unit base 32 and includes a slot for battery 36 and a connection for LED display 38. Battery 36 provides power for remote unit 22 and is replaceable when expended. Remote unit casing 40 is attached to remote unit base 32 and completely encases internal circuitry 34, battery 36, and LED display 38. Remote unit casing 40 is attached to remote unit base 32 such that remote unit casing 40 is detachable and reattachable to allow access inside remote unit 22 to reach and replace battery 36. Remote unit casing 40 provides protection for remote unit 22 and contains an opening that is covered by translucent cover 42. Translucent cover 42 consists of a translucent material to allow light from LED display 38 to be visibly observable, and also provides protection for remote unit 22.

LED display 38 includes a plurality of individual LEDs. The present invention is not intended to be limited to a set number of LEDs or particular colors. For example, LED display 38 may include one or more red LEDs to provide red visual warning signals when braking or deceleration is occurring. In addition to the red LED's, LED display 38 may include one or more white LEDs to provide white visual warning signals when a reverse operating motion is detected.

Alternatively, LED display 38 may include a number of clear LEDs designated into two groups. The first group provides visual warnings when braking or deceleration is detected and the second group provides visual warnings when a reverse operating motion is detected. Correspondingly, translucent cover 42 may be divided into two colors: Red and white, which respectively correspond to the designated LEDs. In either example, the result provides red visual warnings for braking and deceleration, and white visual warnings for reverse operation.

When a wireless transmission is emitted from local unit 20 to remote unit 22, internal circuitry 34 receives and interprets the wireless transmission. If the wireless transmission regards an activation of the braking system of motorcycle 10, then internal circuitry 34 directs LED display 38 to provide a continuous red brake light via red LEDs. If the wireless transmission regards deceleration of motorcycle 10 or motorist 16 being away from motorcycle 10, then internal circuitry 34 directs LED display 38 to provide a flashing red light via red LEDs. If the wireless transmission regards a reverse operating motion of motorcycle 10, then internal circuitry 34 directs LED display 38 to provide an continuous white reverse light via white LEDs. As such, remote unit 22 provides for the ability to receive wireless transmissions from local unit 20 regarding operating conditions of motorcycle 10, and to produce corresponding warning signals to enhance safety to motorist 16 without the need of burdensome wire connections.

Figure 4:
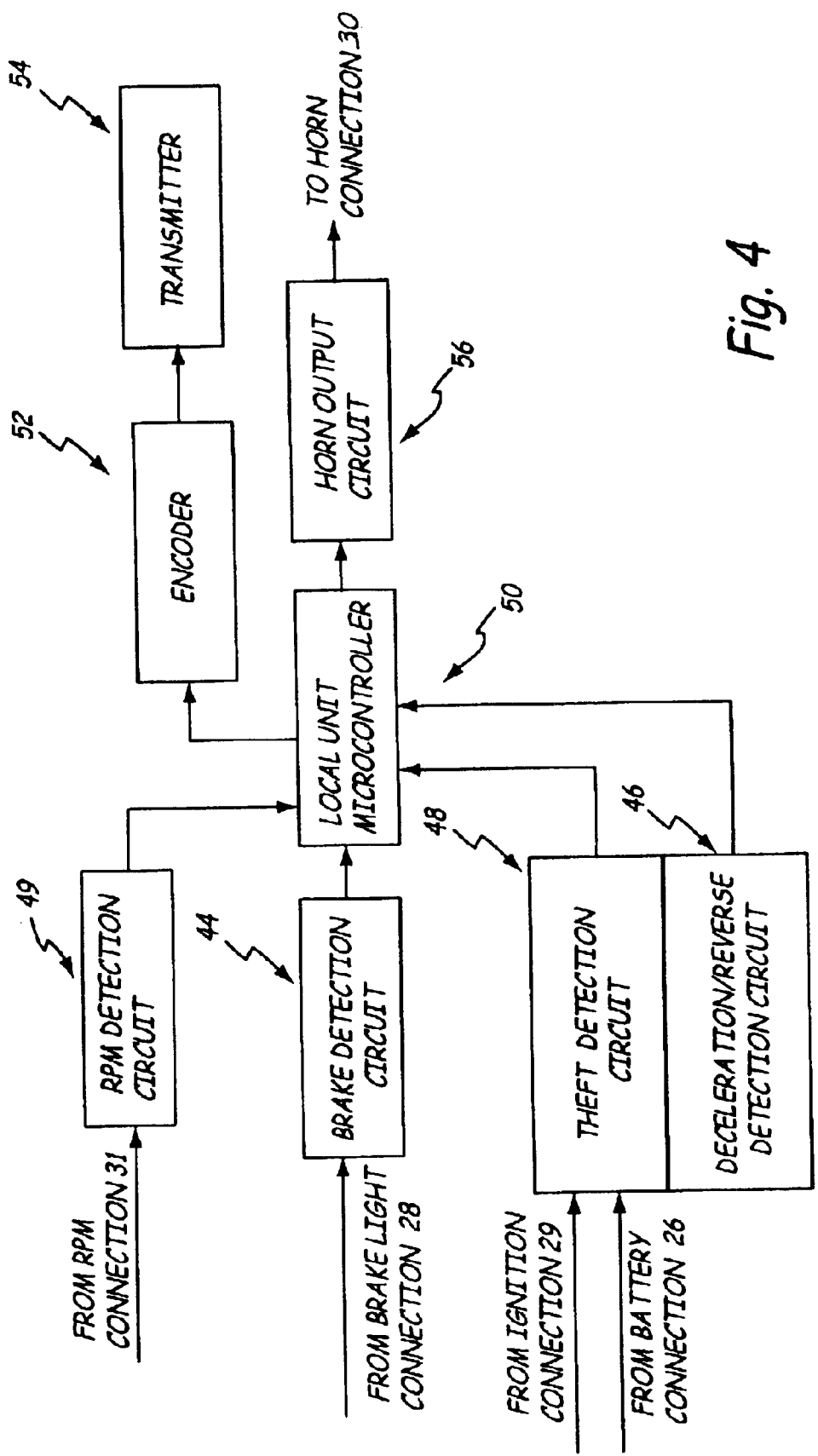
FIG. 4 is block diagram of the local unit of the first embodiment of the present invention.

FIG. 4 is a block diagram of elements of local unit 20, located within local unit casing 24, containing brake detection circuit 44, deceleration/reverse detection circuit 46, theft detection circuit 48, RPM detection circuit 49, local unit microcontroller 50, encoder 52, transmitter 54, and horn output circuit 56.

Brake detection circuit 44, deceleration/reverse detection circuit 46, theft detection circuit 48, and RPM detection circuit 49 are connected to and send signals to local unit microcontroller 50. Brake detection circuit 44 has a second end connected to and capable of receiving electrical current from brake light connection 28. Theft detection circuit 48 has two second ends connected to and capable of receiving electrical current from battery connection 26 and ignition connection 29. RPM detection circuit 49 has a second end connected to and capable of receiving signals from RPM connection 31. Local unit microcontroller 50 is also connected to encoder 52 and horn output circuit 56. Local unit microcontroller 50 is programmed to detect and interpret signals from brake detection circuit 44, deceleration/reverse detection circuit 46, theft detection circuit 48, and RPM detection circuit 49, and produce corresponding outputs to encoder 52 and/or horn output circuit 56.

Brake detection circuit 44 detects when motorcycle 10 is braking. When brakes 14 of motorcycle 10 are activated, an electrical current is sent through the brake light circuit of motorcycle 10, allowing tail light 12 to flash. When local unit 20 is connected to the brake light system of motorcycle 10 via brake light connection 28, the electrical current is also sent to brake detection circuit 44 via brake light connection 28. If brake detection circuit 44 detects the electrical current, brake detection circuit 44 sends a signal to local unit microcontroller 50 that brakes 14 of motorcycle 10 are activated.

Deceleration/reverse detection circuit 46 detects acceleration or deceleration of motorcycle 10 through the use of an acceleration detector. An efficient type of acceleration detector is an accelerometer, which measures acceleration and deceleration by measuring force exerted on an object, such as a suspended weight, when acceleration or deceleration occurs. The force measured is created by an inertial resistance to the acceleration or deceleration of the object. When acceleration or deceleration occurs, the object shifts from its neutral position because of its inertia. The distance the weight moves is measured and calculated as an inertial force. Deceleration/reverse detection circuit 46 continuously measures the inertial forces and simultaneously sends signals regarding the inertial forces to local unit microcontroller 50.

Deceleration/reverse detection circuit 46 uses the acceleration detector positioned in a nose-tail direction to detect when motorcycle 10 decelerates rapidly and when motorcycle 10 is backing up (reverse operation). When motorcycle 10 either decelerates or backs up, the accelerometer weight shifts from its neutral position in the same direction. Local unit 20 is capable of distinguishing between deceleration and reverse operation through the use of force thresholds, which are a parameters programmed into local unit microcontroller 50. The force thresholds include a deceleration force threshold, an upper reverse force threshold, and a lower reverse force threshold.

The deceleration force threshold is set at a substantially greater inertial force than the upper reverse force threshold and the lower reverse force threshold. This is because the rate of deceleration of motorcycle 10 prompting a deceleration warning signal is substantially greater than the rate of acceleration created by manually backing up motorcycle 10. Generally, motorcycles do not have motorized means of driving in a reverse operation and must be manually backed up. Additionally, those that do have motorized reverse means operate at low speeds, with low rates of acceleration. As such, the rate of acceleration of motorcycle 10 when backing up is relatively small compared to the deceleration rate when driving.

The deceleration force threshold is set at a particular inertial force level so that low rates of deceleration do not trigger a deceleration warning light. The particular inertial force level that the deceleration force threshold may be set at will vary between personal motor vehicles, but is substantially greater than the upper reverse force threshold. The upper reverse force threshold and the lower reverse force threshold define a range of acceleration corresponding to a typical rate of acceleration obtained when a motorcycle is manually backed up. The particular rate of acceleration that the upper reverse force threshold and the lower reverse force threshold define will also vary between personal motor vehicles, but is correspondingly substantially less than the deceleration force threshold. The lower reverse force threshold is used so that very small rates of acceleration in reverse do not trigger a reverse operation warning light.

When motorcycle 10 decelerates, deceleration/reverse detection circuit 46 measures the inertial forces, which are compared to the force thresholds at local unit microcontroller 50. If the inertial forces are greater than the deceleration force threshold, then local unit microcontroller 50 produces outputs that motorcycle 10 is decelerating rapidly. If the inertial forces are less than the deceleration force threshold and greater than the upper reverse force threshold, then local unit microcontroller 50 does not produce a corresponding output.

When motorcycle 10 is manually backed up, deceleration/reverse detection circuit 46 measures the inertial forces, which are compared to the force thresholds at local unit microcontroller 50. If the inertial forces fall within the range of the upper reverse force threshold and the lower reverse force threshold, then local unit microcontroller 50 produces outputs that motorcycle 10 is backing up.

Alternatively, deceleration detection and reverse operation detection may be performed by two separate acceleration detectors, where each measures an inertial force, instead of single deceleration/reverse detection circuit 46. Also, devices under the present invention do not necessarily need to incorporate both deceleration detection and reverse operation detection. For example, devices under the present invention may include brake detection and deceleration detection, without reverse operation detection. However, deceleration operation detection provides an additional warning signal to enhance safety to motorist 16.

Moreover, the force thresholds may alternatively be programmed into deceleration/reverse detection circuit 46 instead of local unit microcontroller 50. In such case, the measured inertial forces are compared to the force thresholds at deceleration/reverse detection circuit 46. If the inertial force is greater than the deceleration force threshold, or falls within the range between the upper reverse force threshold and the lower reverse force threshold, then deceleration/reverse detection circuit 46 sends a signal to local unit microcontroller 50 that motorcycle 10 is decelerating or backing up, respectively.

Theft detection circuit 48 detects when motorcycle 10 is moved when motorcycle 10 is not running, and is used for theft prevention. Theft detection circuit 48 incorporates the nose-tail acceleration detector used in deceleration/ reverse detection circuit 46. Additionally, theft detection circuit 48 incorporates a second acceleration detector positioned in a left side-right side direction, perpendicular to the nose-tail acceleration detector. The left side-right side acceleration detector is identical to the nose-tail acceleration detector, and measures acceleration of motorcycle 10 in a left or right direction. Thus, with the use of a nose-tail acceleration detector and a left side-right acceleration side detector, theft detection circuit 48 can detect if motorcycle 10 is moved in any two-dimensional direction. Alternatively, nose-tail acceleration detector and the left side-right side acceleration detector may be a single, multi-directional accelerometer, which is capable of measuring acceleration in any two-dimensional direction. If a multi-directional accelerometer is used, deceleration/reverse detection circuit 46 then only measures inertial forces in the nose-tail direction and ignores the left side-right side inertial forces detected.

If motorcycle 10 is moved when not running, theft detection circuit 48 measures and calculates the corresponding inertial forces from the acceleration detectors and compares the inertial forces to force thresholds. The force thresholds are parameters programmed into theft detection circuit 48 to prevent small movements from triggering a theft warning signal. Without the force thresholds, then depending on the sensitivity of the acceleration detectors, extremely slight movements could set off the warning signals.

Theft detection circuit 48 additionally detects when motorcycle 10 is not running. When motorcycle 10 is started up, the ignition switch closes to allow an electrical current to run through the ignition switch circuit. However, if motorcycle 10 is not running, the ignition switch is open, which prevents the electrical current from running through the ignition switch circuit. When local unit 20 is connected to the ignition switch circuit of motorcycle 10 via ignition connection 29, any electrical current sent through the ignition switch circuit is also sent to theft detection circuit 48 via ignition connection 29. Therefore, theft detection circuit 48 is capable of detecting whether the state of the ignition switch is "on" or "off". If theft detection circuit 48 does not detect electrical current from the ignition switch circuit (the state of the ignition switch is "off") and if the inertial force is greater than the force threshold, then theft detection circuit 48 sends a signal to microcontroller 34 that motorcycle 10 is being moved while not running.

RPM detection circuit 49 detects the RPMs of the engine of motorcycle 10. While motorcycle 10 is being operated, the RPMs of the engine increase proportionally with the speed of motorcycle 10. Accordingly, a signal representing the RPMs is sent through the RPM monitoring circuit of motorcycle 10 to an RPM gauge. When local unit 20 is connected to the RPM monitoring circuit of motorcycle 10 via RPM connection 31, the signal is also sent to RPM detection circuit 49 via RPM connection 31. As RPM detection circuit 49 detects the signals, the corresponding RPM levels are measured and compared to the shift points at local unit microcontroller 50. If the RPMs reach a level corresponding to a shift point, local unit microcontroller 50 produces outputs that motorcycle 10 has reached an RPM level for shifting gears.

RPM connection 31 may alternatively be connected to the power circuit from the alternator of motorcycle 10 for detecting the current produced, which is proportional to the RPM levels of the engine of motorcycle 10. As such, as RPM detection circuit 49 detects the current, the corresponding RPM levels are measured and compared to the shift points at local unit microcontroller 50. If the RPMs reach a level corresponding to a shift point, local unit microcontroller 50 produces outputs that motorcycle 10 has reached an RPM level for shifting gears.

The shift points are preselected RPM levels programmed at desired points where gear shifting of motorcycle 10 should occur. The RPM levels of the shift points are customizable and may be inputed into local unit 20 by conventional manners such as input via personal computer. A preferred method of using the shift points is through the use of selectable modes, which motorist 16 may manually choose from. Each mode contains one or more preprogrammed shift points designated by the desired mode of operation. For example, in a racing mode, there may only be a single designated shift point, set at a high RPM level. In a fuel-efficiency mode, there may be multiple designated shift points, set at a wide range of RPM levels to provide fuel efficiency. Motorist 16 may be able to switch between the modes via an external switch located on local unit 20 or at a remote location functionally connected to local unit 20 via direct wire connection or telemetry means.

Alternatively, the RPM levels corresponding to the shift points may alternatively be programmed into RPM detection circuit 49 instead of local unit microcontroller 50. In such case, the measured RPMs are compared to the shift points at RPM detection circuit 49. If the RPMs reach a level corresponding to a shift point, then RPM detection circuit 49 sends a signal to local unit microcontroller 50 that motorcycle 10 has reached an RPM level for shifting gears.

When local unit microcontroller 50 receives signals from brake detection circuit 44, deceleration/reverse detection circuit 46, or RPM detection circuit 49, local unit microcontroller 50 produces an output to encoder 52 corresponding to the signal received. If local unit microcontroller 50 receives a signal from theft detection circuit 48, local unit microcontroller 50 produces an output to horn output circuit 56. Local unit microcontroller 50 may also produce a corresponding output to encoder 52 to allow remote unit 22 to provide an additional theft warning signal.

Horn output circuit 56 allows local unit 20 to control the horn of motorcycle 10 to provide an audible alarm. If local unit microcontroller 50 produces an output to horn output circuit 56, then horn output circuit 56 allows an electrical current to flow from battery connection 26, through horn output circuit 56, to the horn system of motorcycle 10 via horn connection 30, allowing the horn of motorcycle 10 to produce an audible warning.

Encoder 52 is a signal encoder, which is commonly used in remote control systems. A signal encoder digitally encodes signals before the signals are sent to a transmitter, such as transmitter 54. The signals are encoded so that signals emitted by transmitter 54 are only interpreted by a corresponding decoder. An encoder and corresponding decoder are set to identical digital encoding codes. Only signals from encoders and decoders with identical digital encoding/decoding codes may be decoded for use. This prevents signals emitted from interfering with unwanted devices that receive the signals. When local unit microcontroller 50 provides an output to encoder 52, such as an output that brakes 14 of motorcycle 10 are activated, encoder 52 encodes the output and then sends the encoded signal to transmitter 54.

Transmitter 54 is a wireless communication transmitter, preferably a radio-frequency (RF) transmitter, connected to and capable of receiving encoded signals from encoder 52. Transmitters receive encoded signals from encoders and emit the encoded signals as wireless transmissions. As such, when transmitter 54 receives an encoded signal from encoder 52, transmitter 54 emits the encoded signal as a wireless transmission. The wireless transmission is then received by remote unit 22 (not shown). The use of transmitter 54 avoids the need for a burdensome wire connection between local unit 20 and remote unit 22 while still allowing a reliable signal transfer.

Local unit 20 provides for the ability to detect operating conditions regarding motorcycle 10, such as braking, decelerating, backing tip (reverse operation), and movement when not running. Upon detecting the operating conditions, local unit 20 emits corresponding wireless transmissions to remote unit 22. Therefore, local unit 22 is an efficient device for detecting potentially hazardous situations and for transmitting such detections.

Figure 5:
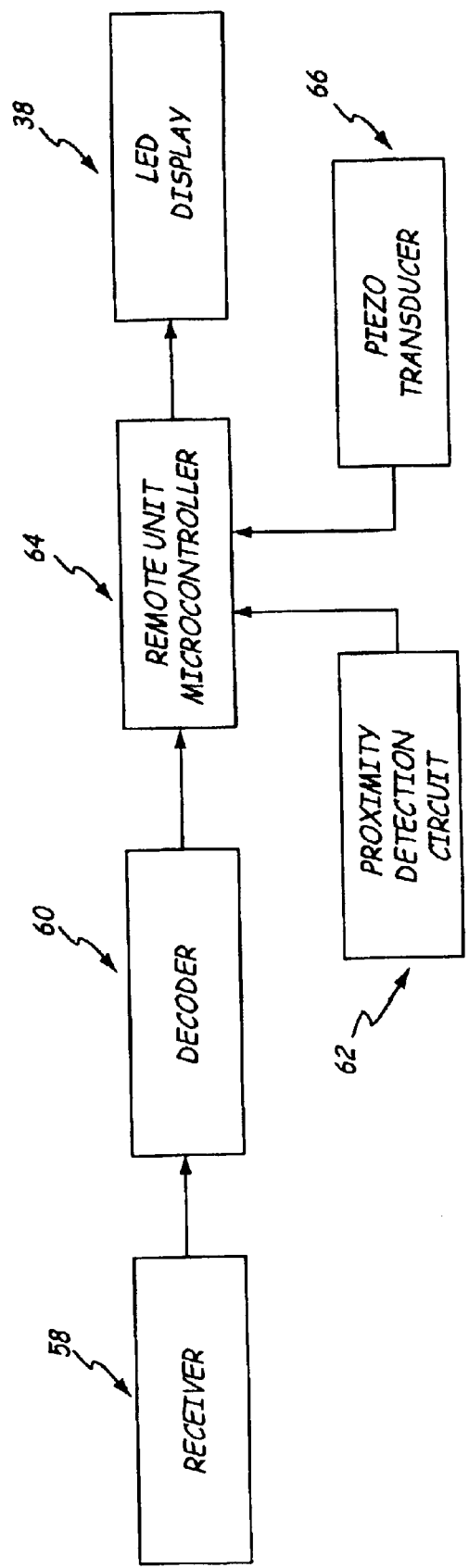
FIG. 5 is a block diagram of the remote unit of the first embodiment of the present invention.

FIG. 5 is a block diagram of elements of remote unit 22, located within remote unit casing 40, containing receiver 58, decoder 60, proximity detection circuit 62, remote unit microcontroller 64, LED display 38, and piezo transducer 66. Receiver 58, decoder 60, proximity detection circuit 62, remote unit microcontroller 64, and piezo transducer 66 are components of internal circuitry 34 in FIG. 3. Receiver 58 is connected to and sends encoded signals to decoder 60. Decoder 60 and proximity detection circuit 62 are connected to and send signals to remote unit microcontroller 64. Remote unit microcontroller 64 is connected to and produces outputs to LED display 38 and piezo transducer 66.

Receiver 58 is a receiver that receives wireless transmissions emitted from transmitter 54 and converts the wireless transmissions into electrical signals. The electrical signals are then decoded by decoder 60. In order to decode encoded signals sent from local unit 20, decoder 60 and encoder 42 must have identical digital encoding/decoding codes. The signals that result from the decoding are then sent from decoder 60 to remote unit microcontroller 64.

Proximity detection circuit 62 is a signal sensor that constantly monitors the transmission field strength between local unit 20 and remote unit 22 and sends signals regarding the transmission field strength to remote unit microcontroller 64. The purpose of proximity detection circuit 62 is to enhance safety to motorist 16 by providing a warning light to show the location of motorist 16 when motorist 16 is away from motorcycle 10. This is useful in poorly lit conditions when motorist 16 is away from motorcycle 10 and not readily visible to traffic.

As remote unit microcontroller 64 receives signals from proximity detection circuit 62 regarding transmission field strengths, remote unit microcontroller 64 compares the signal to a field strength threshold. The field strength threshold is a transmission field strength parameter, programmed into remote unit microcontroller 64, which determines what distance remote unit 22 must be from local unit 20 (and correspondingly, from motorcycle 10) for remote unit 22 to flash a warning light. The transmission field strength between local unit 20 and remote unit 22 diminishes as remote unit 22 moves away from local unit 20. The purpose of the field strength threshold is so that the warning light does not constantly emit while motorist 16 is riding motorcycle 10. As motorist 16, while wearing helmet 18, moves away from motorcycle 10, proximity detection circuit 62 detects the transmission field strength between local unit 20 and remote unit 22. The transmission field strength is then compared to the field strength threshold at remote unit microcontroller 64. When the field strength becomes less than the transmission field strength threshold, remote unit microcontroller 64 produces an output that motorist 16 is away from motorcycle 10.

The field strength threshold may alternatively be programmed into proximity detection circuit 62 instead of remote unit microcontroller 64. In such case, the detected transmission field strengths are compared to the field strength threshold at proximity detection circuit 62. When the transmission field strength becomes less than the field strength threshold, proximity detection circuit 62 sends a signal to remote unit microcontroller 64 that motorist 16 is away from motorcycle 10.

When remote unit microcontroller 64 receives a signal from decoder 60 (regarding an operating condition of motorcycle 10) or proximity detection circuit 62 (regarding motorist 16 being away from motorcycle 10), then depending on the signal received, remote unit microcontroller 64 produces an output to either LED display 38 and/or piezo transducer 66. Preferably, if the signals correspond to operating conditions of braking, deceleration, reverse operation, or proximity detection warning, then remote unit microcontroller 64 produces corresponding outputs to LED display 38. If the signals correspond to theft detection, then remote unit microcontroller 64 produces corresponding outputs to both LED display 38 and piezo transducer 66. Finally, if the signals correspond to RPM shift point detection, then remote unit microcontroller 64 produces corresponding outputs to piezo transducer 66. The present invention, however, is not intended to be limited to such combinations.

LED display 38 emits warning lights from remote unit 22 to reduce danger to motorist 16 by providing visual warnings to following traffic. When LED display 38 receives an output from remote unit microcontroller 64, LED display 38 emits a warning light. Electrical current for LED display 38 is provided by battery 36. As such, LED display 38 functions as visible warning lights.

The light from LED display 38 may also be flashed. Remote unit microcontroller 64 may pulse the electrical current sent from battery 36 to LED display 38. This results in a flashing effect from LED display 38 and is useful with deceleration warnings to distinguish them from continuously illuminated brake lights.

Piezo transducer 62 emits an audible output when an electrical current is applied and is useful as an audible alarm. In response to a wireless transmission emitted from local unit 20, such as regarding theft detection or RPM shift point detection, microcontroller 68 sends a signal to piezo transducer 62. Piezo transducer 62 then produces an audible output for motorist 16 to hear. Electrical current for piezo transducer 62 is provided by battery 36. The audible output warns motorist 16 that motorcycle 10 is being moved to provide notice of a potential theft or that an RPM shift point has been reached. Alternatively, piezo transducer 62 may be external to remote unit 22 and connected to remote unit 22 via wire. This allows piezo transducer 62 to be placed near an ear of motorist 16.

Remote unit 22 provides the ability to receive signals transmitted from local unit 20 to emit warning signals. Such warning signals enhance safety to motorist 16 when potentially hazardous situations occur. Additionally, by being wireless, remote unit 22 is portable and precludes the need of burdensome wire connections.

Figure 5A:
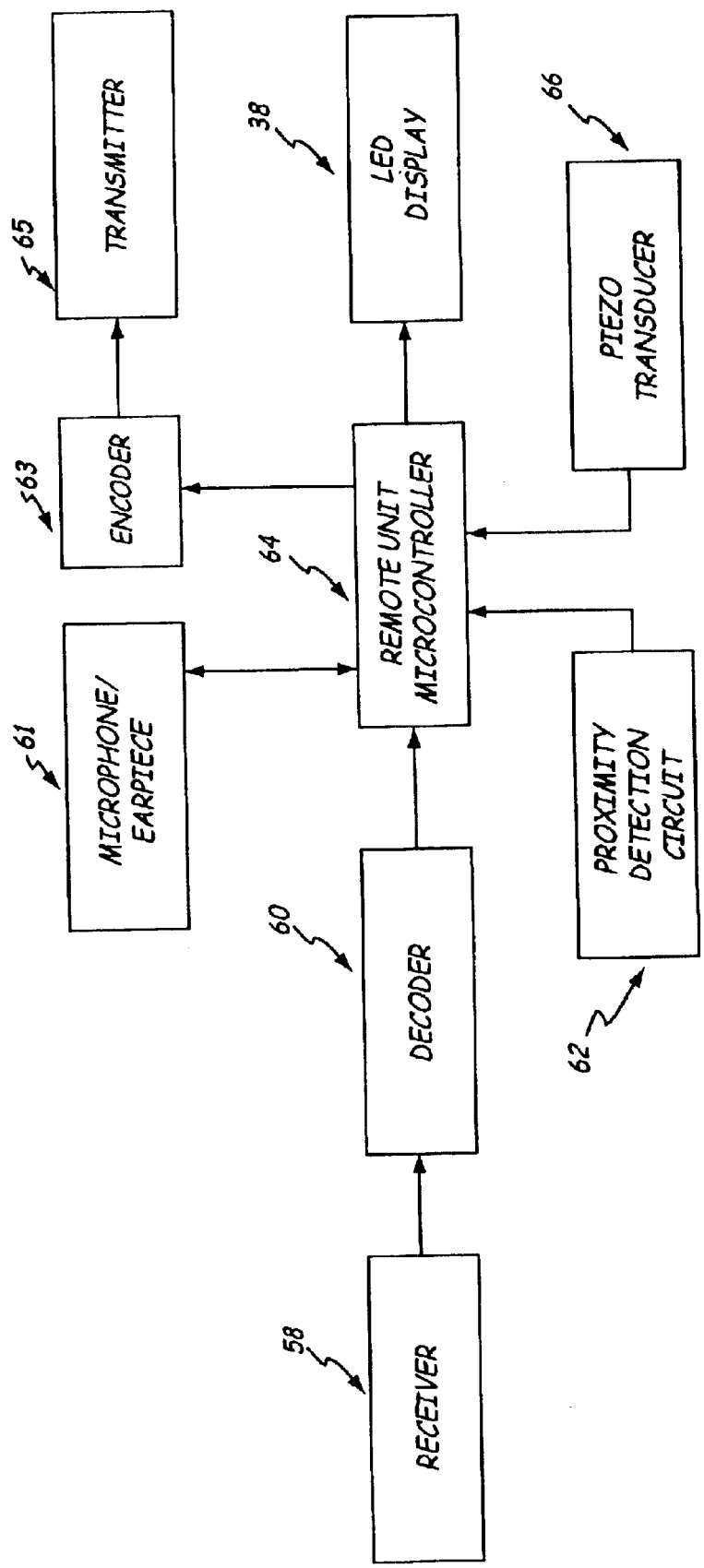
FIG. 5a is a block diagram of the remote unit of an additional concept of the first embodiment of the present invention.
Figure 5B:
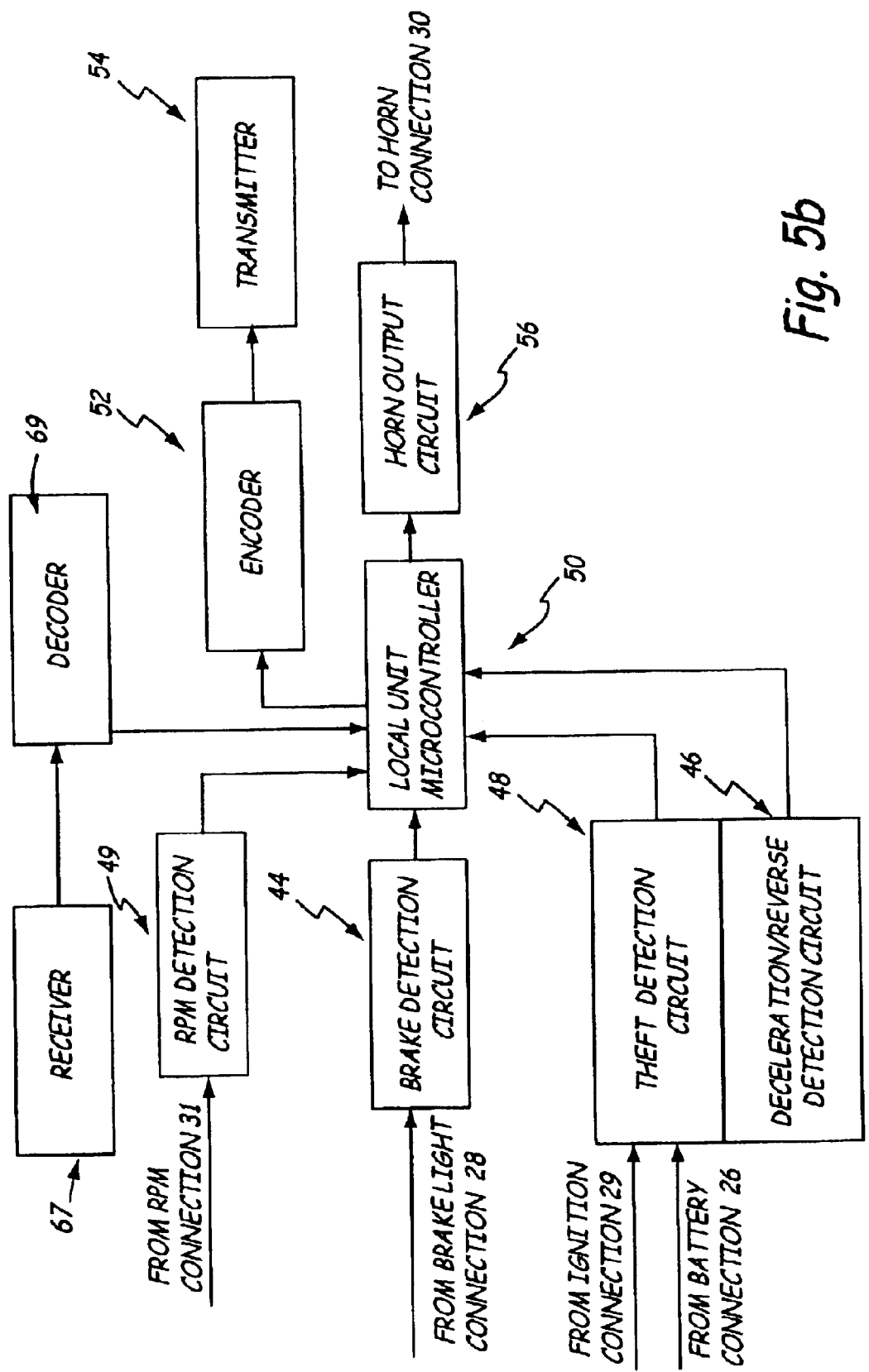
FIG. 5b is block diagram of the local unit of the additional concept of the first embodiment of the present invention.

FIGS. 5a and 5b are block diagrams of remote unit 22 and local unit 20, illustrating an additional concept of the first embodiment of the present invention. The additional concept includes the use of a two-way voice communication system that incorporates many of the components of local unit 20 and remote unit 22. It is a hands-free voice communication system that allows riders to talk to each other when each rider wears a helmet 18 incorporating a remote unit 22.

As illustrated in FIG. 5a, the two-way voice communication system includes microphone/earpiece 61, which is worn by motorist 16 under helmet 18, and is a conventional microphone/earpiece system, such as a cellular phone microphone and earpiece headset. Microphone/earpiece 61 plugs into remote unit 22, connecting microphone/earpiece 61 to remote unit microcontroller 64 for sending and receiving signals to and from remote unit microcontroller 64. When motorist 16 speaks into the microphone of microphone/earpiece 61, a corresponding signal is sent to remote unit microcontroller 64.

With the two-way voice communication system, remote unit 22 also incorporates encoder 63 and transmitter 65. Encoder 63 is a signal encoder for digitally encoding signals and is connected to remote unit microcontroller 64 for encoding the outputs of remote unit microcontroller 64. Transmitter 65 is a short-distance wireless communication transmitter connected to and capable of receiving encoded signals from encoder 63. When remote unit microcontroller 64 receives signals from the microphone of microphone/earpiece 61, remote unit microcontroller 64 produces corresponding outputs to encoder 63. Encoder 63 then encodes the outputs and sends the encoded signal to transmitter 65. Transmitter 65 then emits a wireless transmission of the encoded signal.

Encoder 63 is set at a different digital encoding/decoding codes from encoder 52 and decoder 60 so that remote unit 22 does not interpret signals emitted by encoder 63. This is to prevent the wireless transmissions emitted from transmitter 65 from interfering with the wireless transmissions emitted from transmitter 54.

As illustrated in FIG. 5b, in order to receive the emitted wireless transmissions from transmitter 65, local unit 20 additionally incorporates receiver 67 and decoder 69. Receiver 67 is a receiver that receives wireless transmissions emitted from transmitter 65 and converts the wireless transmissions into electrical signals. Decoder 69 is connected to, and receives and decodes the electrical signals from receiver 67. In order to decode the electrical signals, decoder 69 and encoder 63 must have identical digital encoding/decoding codes (which differ from those of encoder 52 and decoder 60 to avoid interference). Decoder 69 is also connected to local unit microcontroller 50 for sending the decoded signals to local unit microcontroller 50.

When local unit microcontroller 50 receives signals from decoder 69, local unit microcontroller 50 then produces outputs to encoder 52 that motorist 16 is communicating through microphone/earpiece 61. Encoder 52 then encodes the output and sends the encoded signal to transmitter 54. Transmitter 54 then emits a corresponding wireless transmission. The wireless transmission is intercepted by all remote units 22 within the transmission range. For each remote unit 22, the wireless transmission is received by receiver 58. The wireless transmission is then decoded by decoder 60 in each remote unit 22 and sent to remote unit microcontroller 64. Remote unit microcontroller 64 detects the signal and identifies it as relating to communication. Because the signals relate to communication, remote unit microcontroller 64 produces a corresponding output to the earpiece of microphone/earpiece 61 so that each motorist may hear the communication.

The two-way voice communication system is useful when multiple remote units 22 are used with a single local unit 20, such as with multiple riders on motorcycle 10. The use of local unit 20 and remote unit 22 provides a hands-free communication system for the driver and passenger.

Moreover, the wireless transmission from remote unit 22 may also be intercepted by other local units 20 connected to other motorcycles in close vicinity. If both systems use the same digital encoding/decoding codes for the two-way voice communication system, then the other local units 20 will also receive the emitted wireless transmission from transmitter 65 and emit corresponding wireless transmissions to their respective remote units 22. This allows voice communication to occur between operators using separate local units 22, while not interfering with the warning signals for each vehicle.

For an example of an application of the first embodiment of the present invention, assume that motorcycle 10 decelerates without motorist 16 applying brakes 14. Deceleration/reverse detection circuit 46 measures and calculates the corresponding inertial forces, and sends signals regarding the inertial forces to local unit microcontroller 50. Local unit microcontroller 50 then compares the inertial forces to the force thresholds. If motorcycle 10 is decelerating fast enough so that the inertial force is greater than the deceleration force threshold, then local unit microcontroller 50 produces an output to encoder 52 that motorcycle 10 is decelerating. Encoder 52 then digitally encodes the signal and sends the encoded signal to transmitter 54. Transmitter 54 then emits the encoded signal from local unit 20 as a wireless transmission.

The wireless transmission is intercepted by receiver 58 in remote unit 22 and decoded by decoder 60. The decoded signal is then sent from decoder 60 to remote unit microcontroller 64. Remote unit microcontroller 64 detects the signal and identifies it as relating to deceleration. Because the signal relates to deceleration, remote unit microcontroller 64 sends a corresponding signal to LED display 38. LED display 38 then flashes a red warning light oriented behind motorist 16. Traffic following motorist 16 will be able to observe the flashing warning light and identify that motorcycle 10 is decelerating. This decreases danger to motorist 16 by providing notice to following traffic of the rapid deceleration.

As motorist 16 operates motorcycle 10, RPM detection circuit 49 detects signals corresponding to the RPMs of the engine of motorcycle 10 via RPM connection 31. RPM detection circuit 49 measures and calculates the corresponding RPMs, and sends signals regarding the RPMs to local unit microcontroller 50. Local unit microcontroller 50 then compares the RPMs to the preselected shift points. If the RPMs reach a level corresponding to a shift point, then local unit microcontroller 50 produces an output to encoder 52 that motorcycle 10 needs to be shifted to a different gear. Encoder 52 then digitally encodes the signal and sends the encoded signal to transmitter 54. Transmitter 54 then emits the encoded signal from local unit 20 as a wireless transmission.

The wireless transmission is intercepted by receiver 58 in remote unit 22 and decoded by decoder 60. The decoded signal is then sent from decoder 60 to remote unit microcontroller 64. Remote unit microcontroller 64 detects the signal and identifies it as relating to gear shifting. Because the signal relates to gear shifting, remote unit microcontroller 64 sends a corresponding signal to piezo transducer 66. Piezo transducer 66 then emits an audible warning to motorist 16 that motorcycle should be switched into a different gear. This provides notice to motorist 16 of the need to shift gears without having to look at a visual shift light or RPM gauge, which could otherwise distract motorist 16.

If motorist 16 then activates brakes 14 of motorcycle 10, brake detection circuit 44 detects the current flowing through the brake light circuit of motorcycle 10 via brake light connection 28. Brake detection circuit 44 then sends a signal to local unit microcontroller 50 that brakes 14 of motorcycle 10 are activated. Local unit microcontroller 50 detects and interprets the signal and then produces an output to encoder 52. Preferably, if local unit microcontroller 50 simultaneously detects signals regarding braking and deceleration, local unit microcontroller 50 produces an output regarding braking only. That is, the braking output overrides the deceleration output. Upon receipt of the output, encoder 52 then digitally encodes the signal and sends the encoded signal to transmitter 54. Transmitter 54 then emits the encoded signal from local unit 20 as a wireless transmission.

The wireless transmission is intercepted by receiver 58 in remote unit 22 and decoded by decoder 60. The decoded signal is then sent from decoder 60 to remote unit microcontroller 64. Remote unit microcontroller 64 detects the signal and identifies it as relating to braking. Because the signal relates to braking, remote unit microcontroller 64 produces a corresponding output to LED display 38. LED display 38 then emit a continuous red warning light oriented behind motorist 16. Traffic following motorist 16 will be able to observe the warning light and identify that motorcycle 10 is braking, enhancing safety to motorist 16.

Next, assume that motorcycle 10 has come to a complete stop and motorist 16 manually backs motorcycle 10 up in a reverse direction. Deceleration/reverse detection circuit 46 measures and calculates the corresponding inertial forces, and sends signals regarding the inertial forces to local unit microcontroller 50, where it is compared to the force thresholds. If motorist 16 is backing up motorcycle 10 such that the inertial force falls within the range between the upper reverse force threshold and the lower reverse force threshold, local unit microcontroller 50 produces an output to encoder 52 that motorcycle 10 is backing up (reverse operation). Encoder 52 then digitally encodes the signal and sends the encoded signal to transmitter 54. Transmitter 54 then emits the encoded signal from local unit 20 as a wireless transmission.

The wireless transmission is intercepted by receiver 58 in remote unit 22 and decoded by decoder 60. The decoded signal is then sent from decoder 60 to remote unit microcontroller 64. Remote unit microcontroller 64 detects the signal and identifies it as relating to reverse operation. Because the signal relates to reverse operation, remote unit microcontroller 64 produces a corresponding output to LED display 38. LED display 38 then emits a continuous white warning light oriented behind motorist 16. Pedestrians and traffic following motorist 16 will be able to observe the warning light and identify that motorcycle 10 is backing up, enhancing safety to motorist 16.

If motorist 16 leaves motorcycle 10, proximity detection circuit 62 detects the decreasing transmission field strengths as motorist 16 moves away from motorcycle 10 and sends signals to remote unit microcontroller 64. Remote unit microcontroller 64 continuously compares the transmission field strengths to the field strength threshold. When motorist 16 moves far enough away from motorcycle 10 so that the transmission field strengths fall below the field strength threshold, remote unit microcontroller 64 produces a corresponding output to LED display 38. LED display 38 then flashes a red warning light oriented behind motorist 16. Traffic will then be able to see motorist 16 in poorly lit conditions when motorist 16 is away from motorcycle 10.

If motorcycle 10 is then turned off (not running), theft detection circuit 48 detects that no current is flowing through the ignition switch circuit of motorcycle 10 via ignition connection 29. Theft detection circuit 48 then sends a signal to local unit microcontroller 50 that motorcycle 10 is not running. If motorcycle 10 is then moved while not running (such as if motorcycle 10 is being stolen), theft detection circuit 48 measures and calculates the corresponding inertial forces, and sends signals regarding the inertial forces to local unit microcontroller 50. Local unit microcontroller 50 then compares the inertial forces to the force thresholds. If motorcycle 10 is moved fast enough so that the inertial force is greater than the force thresholds, and if local unit microcontroller 50 also receives signals that motorcycle 10 is not running, then local unit microcontroller 50 produces an output to horn output circuit 56. Upon receiving the output, horn output circuit 56 allows local unit 20 to output an electrical current to the horn system of motorcycle 10 via horn connection 30. The electrical current activates the horn of motorcycle 10 to provide an audible warning that motorcycle 10 may be in the process of being stolen and acts as a theft deterrent alarm.

Additionally, local unit microcontroller 50 may also produce an output to encoder 52 that motorcycle 10 is being moved while not running. Upon receipt of the output, encoder 52 then digitally encodes the signal and sends the encoded signal to transmitter 54. Transmitter 54 then emits the encoded signal from local unit 20 as a wireless transmission.

The wireless transmission is intercepted by receiver 58 in remote unit 22 and decoded by decoder 60. The decoded signal is then sent from decoder 60 to remote unit microcontroller 64. Remote unit microcontroller 64 detects the signal and identifies it as relating to theft detection. Because the signal relates to theft detection, remote unit microcontroller 64 produces a corresponding output to LED display 38 and/or piezo transducer 66. LED display 38 then emits a warning light and piezo transducer 66 emits an audible warning. These warnings provide additional notice to motorist 16 that motorcycle 10 maybe in the process of being stolen, allowing motorist 16 to take appropriate action.

As described in the first embodiment, local unit 20 and remote unit 22 of the present invention decrease danger to motorist 16 by providing warning signals regarding operating conditions of motorcycle 10. Because remote unit 22 is portable, it may be positioned at any desired location, including being adorned by motorist 16. These benefits enhance safety to motorist 16 and decrease the risk of loss of property, injuries, and fatalities.

Figure 6:
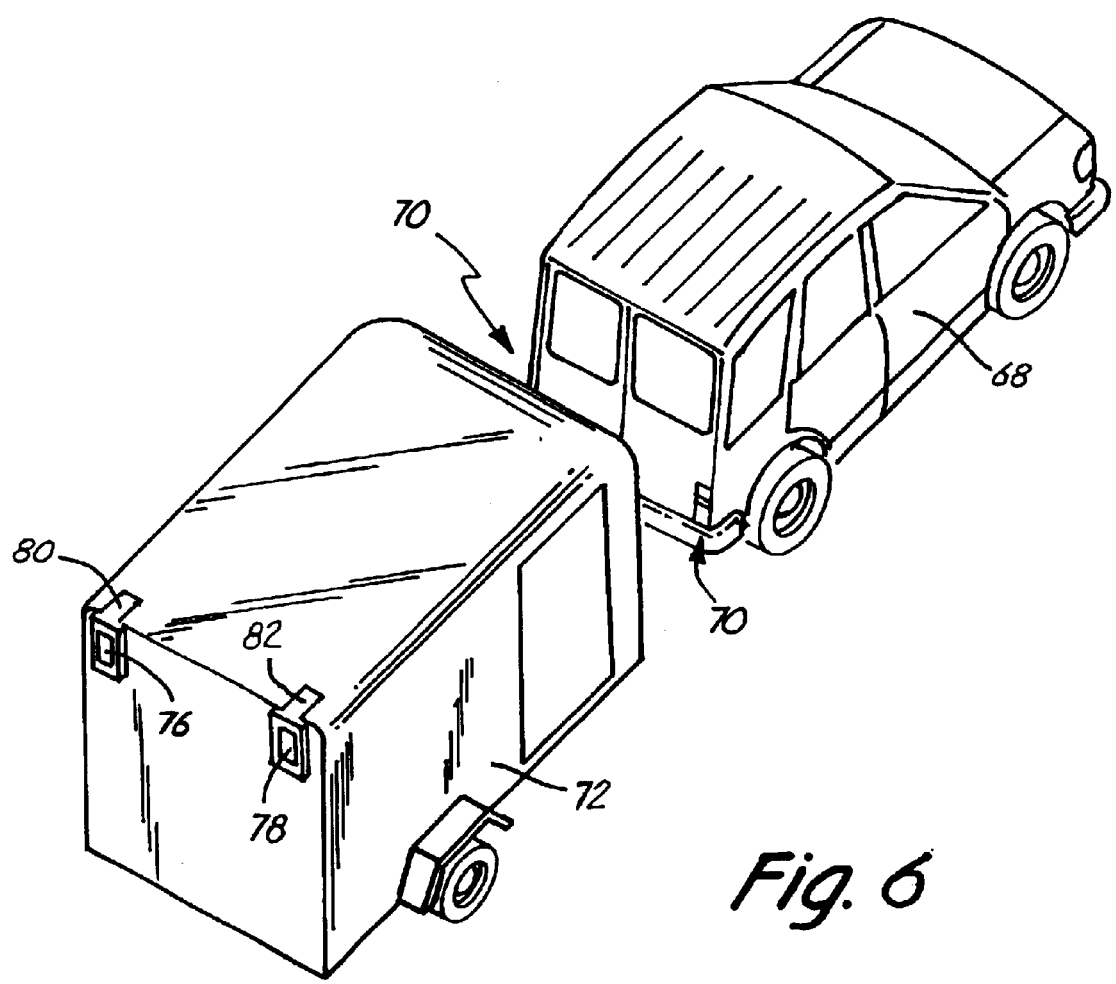
FIG. 6 is an illustration of the second embodiment of the present invention in use.

FIG. 6 is an illustration of the system of a second embodiment of the present invention and includes vehicle 68, tail lights 70, trailer 72, local unit 74 (not shown), left remote unit 76, right remote unit 78, tab 80, and tab 82. While FIG. 6 illustrates the use of a sports utility vehicle, the second embodiment of the present invention is not intended to be limited to sports utility vehicles, and may be used with a variety of towing motor vehicles, such as trucks and automobiles. Vehicle 68 contains a standard braking system activated by brakes (not shown) of vehicle 68, a standard turn signal system activated by left and right turn signals (not shown) of vehicle 68, and a standard reverse system activated by a manual or automatic gear shift (not shown) of vehicle 68. Vehicle 68 also includes tail lights 70, which are standard motor vehicle tail lights. Tail lights 70 provide visual warning signals when vehicle 68 brakes, is placed in reverse gear, and when the turn signals are activated.

Trailer 72 is a conventional trailer and is not intended to be limited to a particular model or design. When being towed, trailer 72 prevents following traffic from being able to see tail lights 70.

Local unit 74 is attached to vehicle 68 and is not required to be attached at a specific location on vehicle 68. Suitable locations for local unit 74 may be within the control console, glove compartment, central arm rest, or trunk of vehicle 68. Left remote unit 76 and right remote unit 78 are removably mounted upon the rear side of trailer 72 and function as wireless tail lights for trailer 72. Left remote unit 76 and right remote unit 78 are mounted to trailer 72 via tab 80 and tab 82 respectively, which are extensions attached to left remote unit 76 and right remote unit 78. Tab 80 and tab 82 may be mounted to trailer 72 in any conventional manner including fasteners and magnets, such that left remote unit 76 and right remote unit 78 may be removed from trailer 72. As such, when trailer 72 is not in use, left remote unit 76 and right remote unit 78 may be removed from trailer 72 and stored for safe keeping.

The use of multiple remote units with a single local unit provides additional warning signals when operating conditions of vehicle 68 are detected, and is especially useful in conjunction with detecting the activation of the turn signals of vehicle 68. While only two remote units are illustrated in FIG. 6, the present invention is not intended to be limited as such, and may incorporate any number of remote units for use with local unit 74.

When local unit 74 detects operating conditions regarding vehicle 68, such as activation of the brakes, deceleration, a reverse operation, or activation of the turning signals, local unit 74 emits wireless transmissions corresponding to the operating conditions detected. Left remote unit 76 and right remote unit 78 then receive the wireless transmissions and produce corresponding warning signals. The types of warning signals emitted by left remote unit 76 and right remote unit 78 depend upon the wireless transmissions emitted by local unit 74, which correspondingly depend upon the operating conditions local unit 74 detects.

A first type of warning signal is produced if the brakes of vehicle 68 are activated. When vehicle 68 is braking, local unit 74 detects this and emits corresponding wireless transmissions to left remote unit 76 and right remote unit 78. Left remote unit 76 and right remote unit 78 then receive the wireless transmissions and produce continuous brake lights from rear side of trailer 72 to warn following traffic that vehicle 68 is braking. Additionally, as illustrated in FIG. 6, if left remote unit 76 and right remote unit 78 are at an elevated level, the brake lights emitted are more noticeable to following traffic than brake lights positioned at lower elevations.

A second type of warning signal is produced if vehicle 68 decelerates. When vehicle 68 is decelerating, local unit 74 detects this and emits corresponding wireless transmissions to left remote unit 76 and right remote unit 78. Left remote unit 76 and right remote unit 78 then receive the wireless transmissions and flash warning lights from rear side of trailer 72 to warn following traffic that vehicle 68 is decelerating. This reduces collision dangers by providing a visible warning to following traffic that vehicle 68 is decelerating. Preferably, the braking warning signals override the deceleration warning signals, so that when the brakes of vehicle 68 are activated, left remote unit 76 and right remote unit 78 will emit continuous brake lights, despite the fact that vehicle 10 will also be decelerating.

A third type of warning signal is produced if vehicle 68 operates in a reverse motion (i.e. placed in reverse gear for backing up). When vehicle 68 is placed in reverse gear, local unit 74 detects this and emits corresponding wireless transmissions to left remote unit 76 and right remote unit 78. Left remote unit 76 and right remote unit 78 then receive the wireless transmissions and produce reverse operation lights from rear side of trailer 72 to warn others that vehicle 68 is backing up.

A fourth type of warning signal is produced if the turning signals of vehicle 68 are activated. Left remote unit 76 and right remote unit 78 incorporate settings to identify a left turn signal unit and a right turn signal unit. As such, left remote unit 76 is identified as the left turn signal unit and right remote unit 78 is identified as the right turn signal unit.

When the left turn signal of vehicle 68 is activated, local unit 74 detects this and emits corresponding wireless transmissions to left remote unit 76 and right remote unit 78. Left remote unit 76, being identified as the left turn signal unit, then receives the wireless transmissions and flashes a warning light from the rear side of trailer 72 to warn following traffic that towing motor vehicle is turning left. When right remote unit 78 receives the wireless transmissions, right remote unit 78, being identified as the right turn signal unit, does not produce a corresponding turn signal.

Correspondingly, when the right turn signal of vehicle 68 is activated, local unit 74 detects this and emits corresponding wireless transmissions to left remote unit 76 and right remote unit 78. Right remote unit 78, being identified as the right turn signal unit, then receives the wireless transmissions and flashes a warning light from the rear side of trailer 72 to warn following traffic that towing motor vehicle is turning right. When left remote unit 76 receives the wireless transmissions, left remote unit 76, being identified as the left turn signal unit, does not produce a corresponding turn signal.

Local unit 74, left remote unit 76, and right remote unit 78 enhance the safety to motorists when trailer 72 is being towed. Local unit 74 detects operating conditions of vehicle 68 and emits wireless transmissions to left remote unit 76 and right remote unit 78, which produce corresponding warning signals. Moreover, because left remote unit 76 and right remote unit 78 are portable, they may produce warning signals from any desired location and may be stored safely away when not in use. These benefits enhance safety to traffic and minimize vehicle-related accidents by providing trailer tail lights for trailer 72.

Figure 7:
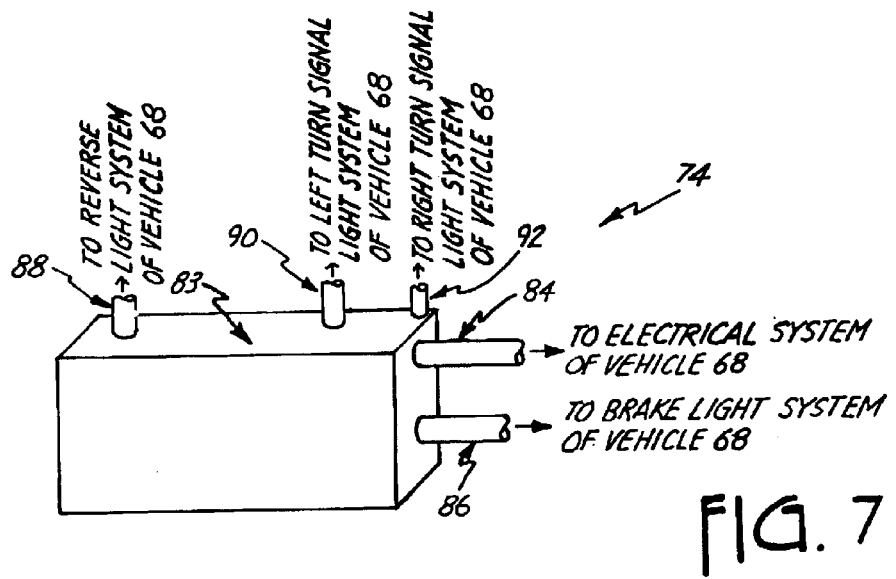
FIG. 7 is a perspective view of the local unit of the second embodiment of the present invention.
Figure 8:
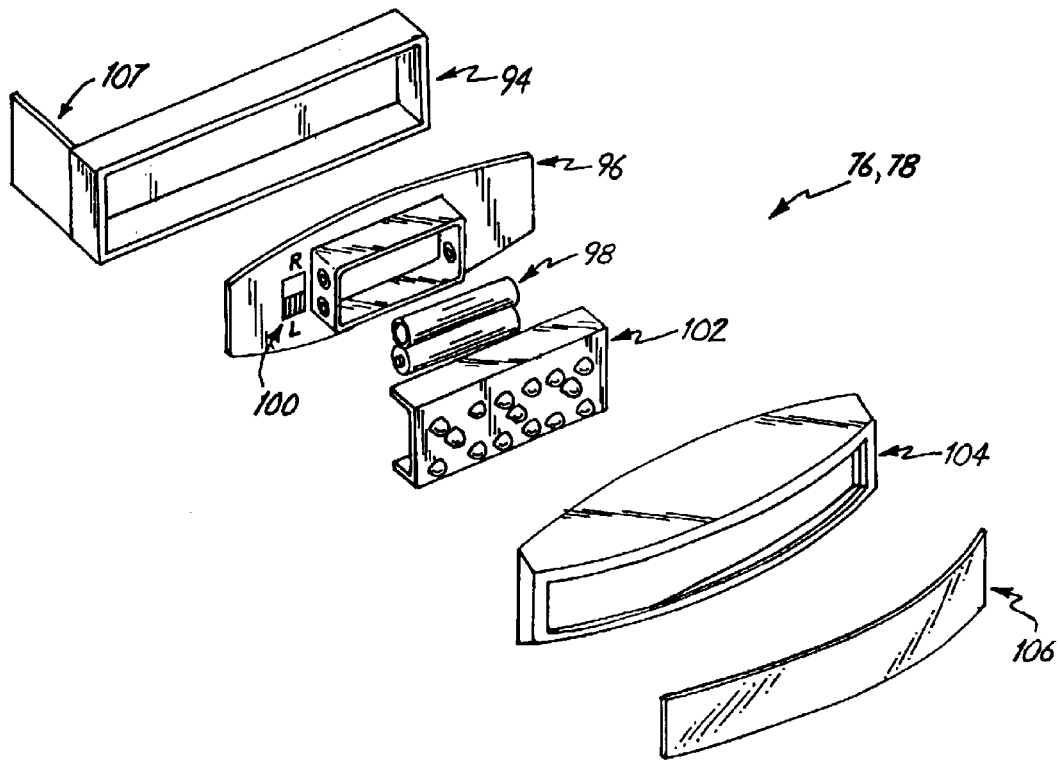
FIG. 8 is an exploded view of the remote unit of the second embodiment of the present invention.

FIGS. 7 and 8 illustrate local unit 74 and a remote unit corresponding to both left remote unit 76 and right remote unit 78. FIG. 7 is a perspective view of external elements associated with local unit 74 including local unit casing 83, battery connection 84, brake light connection 86, reverse light connection 88, left turn signal light connection 90, and right turn signal light connection 92. Local unit casing 83 encompasses and provides protection for local unit 74. Battery connection 84 has a first end extending into local unit casing 83 and a second end connecting to an electrical system of vehicle 68. The electrical system of vehicle 68 is a standard motor vehicle battery-powered system. Battery connection 84 provides local unit 74 with electrical power.

Brake light connection 86 has a first end extending into local unit casing 83 and a second end connecting to a brake light system of vehicle 68. The brake light system of vehicle 68 is a standard motor vehicle brake-light circuit, which directly connects to the tail lights of vehicle 68 and provides the tail lights with electrical current when the brakes are activated. Brake light connection 86 allows local unit 74 to monitor the brake light system of vehicle 68 for detecting an activation of the brakes.

Reverse light connection 88 has a first end extending into local unit casing 83 and a second end connecting to a reverse light system of vehicle 68. The reverse light system of vehicle 68 is a standard motor vehicle reverse-light circuit, which directly connects to tail lights 70 and provides tail lights 70 with electrical current when vehicle 68 is placed in a reverse gear. Reverse light connection 88 allows local unit 74 to monitor the reverse light system of vehicle 68 for detecting when vehicle 68 is placed in a reverse gear.

Left turn signal light connection 90 has a first end extending into local unit casing 83 and a second end connecting to a left turn signal light system of vehicle 68. The left turn signal light system of vehicle 68 is a standard motor vehicle turn signal light circuit, which directly connects to a left light of tail lights 70 and provides the left light of tail lights 70 with electrical current when the left turn signal is activated. Left turn signal light connection 90 allows local unit 74 to monitor the left turn signal light system of vehicle 68 for detecting an activation of the left turn signal.

Right turn signal light connection 92 has a first end extending into local unit casing 83 and a second end connecting to a right turn signal light system of vehicle 68. The right turn signal light system of vehicle 68 is a standard motor vehicle turn signal light circuit, which directly connects to a right light of tail lights 70 and provides the right light of tail lights 70 with electrical current when the right turn signal is activated. Right turn signal light connection 92 allows local unit 74 to monitor the right turn signal light system of vehicle 68 for detecting an activation of the right turn signal.

Local unit 74 provides for the detection of operating conditions of vehicle 68, such as activation of the brakes, deceleration, reverse operation, and an activation of the left and right turn signals. Local unit 74 emits corresponding wireless transmissions to left remote unit 76 and right remote unit 78 to enhance safety to motorists and traffic.

FIG. 8 is an exploded view of a remote unit corresponding to both left remote unit 76 and right remote unit 78 including remote unit base 94, internal circuitry 96, battery 98, identification switch 100, light emitting diode (LED) display 102, remote unit casing 104, translucent cover 106, and tab 107. Remote unit base 94 corresponds to the portions of left remote unit 76 and right remote unit 78 that are supported against trailer 72 in FIG. 6. Tab 107 corresponds to both tab 80 and tab 82 and is attached to a first end of remote unit base 94. Alternatively, tab 107 may be manufactured in the same mold as remote unit base 94.

Internal circuitry 96 is attached inside remote unit base 94 and includes a slot for battery 98, a connection for identification switch 100, and a connection for LED display 102. Battery 98 provides power for the remote unit and is replaceable when expended. Remote unit casing 104 is attached to remote unit base 94 and completely encases internal circuitry 96, battery 98, identification switch 100, and LED display 102. Remote unit casing 104 is attached to remote unit base 94 such that remote unit casing 104 is detachable and reattachable to allow access inside the remote unit to reach and replace battery 98, and to adjust identification switch 100. Remote unit casing 104 provides protection for the remote unit and also contains an opening that is covered by translucent cover 106. Translucent cover 106 consists of a translucent material to allow light from LED display 102 to be visibly observable, and also provides protection for the remote unit.

LED display 102 includes a plurality of individual LEDs. The present invention is not intended to be limited to a set number of LEDs or particular colors. For example, LED display 102 may include one or more of red LEDs to provide red visual warning signals when braking or deceleration is occurring. Additionally, LED display 102 may include one or more of white LEDs to provide white visual warning signals when a reverse operation is detected. Finally, LED display 102 may also include one or more of yellow LEDs to provide yellow visual warning signals when activation of a turn signal is detected.

Alternatively, LED display 38 may include a number of white LEDs designated into three groups. The first group provides visual warnings when braking or deceleration is detected, the second group provides visual warnings when a reverse operation is detected, and the third group provides visual warnings when an activation of a turn signal is detected. Correspondingly, translucent cover 106 may be divided into three colors: Red, white, and yellow, which respectively correspond to the designated LEDs. In either alternative, the result provides red visual warnings for braking and deceleration, white visual warnings for reverse operation, and yellow visual warnings for turn signal activation.

When a wireless transmission is emitted from local unit 74 to a remote unit corresponding to left remote unit 76 and right remote unit 78, internal circuitry 96 receives and interprets the wireless transmission. If the wireless transmission regards an activation of the braking system of vehicle 68, then internal circuitry 96 directs LED display 102 to provide a continuous red brake light via red LEDs. If the wireless transmission regards deceleration of vehicle 68, then internal circuitry 96 directs LED display 102 to provide a flashing red light via red LEDs. If the wireless transmission regards a reverse operation of vehicle 68, then internal circuitry 96 directs LED display 102 to provide a continuous white reverse light via white LEDs. Finally, if the wireless transmission regards activation of a turn signal of vehicle 68, then internal circuitry 96 takes action depending upon the setting of identification switch 100.

Identification switch 100 allows a remote unit to be designated as a left or right remote unit for use with detecting an activation of a left or right turn signal. When identification switch 100 of a given remote unit is set at the "left" setting, as would be in left remote unit 76, then if the wireless transmission received regards activation of a left turn signal of vehicle 68, internal circuitry 96 directs LED display 102 to provide a flashing yellow turn signal light via yellow LEDs. This allows the given remote unit to provide a left turn signal warning light. Correspondingly, if the wireless transmission received regards activation of a right turn signal of vehicle 68, then internal circuitry 96 disregards the wireless transmission and does not direct LED display 102 to provide a flashing yellow turn signal light.

When identification switch 100 of a given remote unit is set at the "right" setting, as would be in right remote unit 78, then if the wireless transmission received regards activation of a right turn signal of vehicle 68, then internal circuitry 96 directs LED display 102 to provide a flashing yellow turn signal light via yellow LEDs. This allows the given remote unit to provide a right turn signal warning light. Correspondingly, if the wireless transmission received regards activation of a left turn signal of vehicle 68, then internal circuitry 96 disregards the wireless transmission and does not direct LED display 102 to provide a flashing yellow turn signal light.

Alternatively, internal circuitry 96 may have a "left" or "right" preset identification. In other words, left remote unit 76 and right remote unit 78 would be manufactured to be permanently designated as "left" and "right" respectively, and would operate accordingly. This would preclude the need for identification switch 100.

Left remote unit 76 and right remote unit 78 provide for the ability to receive wireless transmissions from local unit 74 regarding operating conditions of vehicle 68, and for producing corresponding warning signals, providing trailer 72 with portable tail lights without the need of burdensome wire connections.

Figure 9:
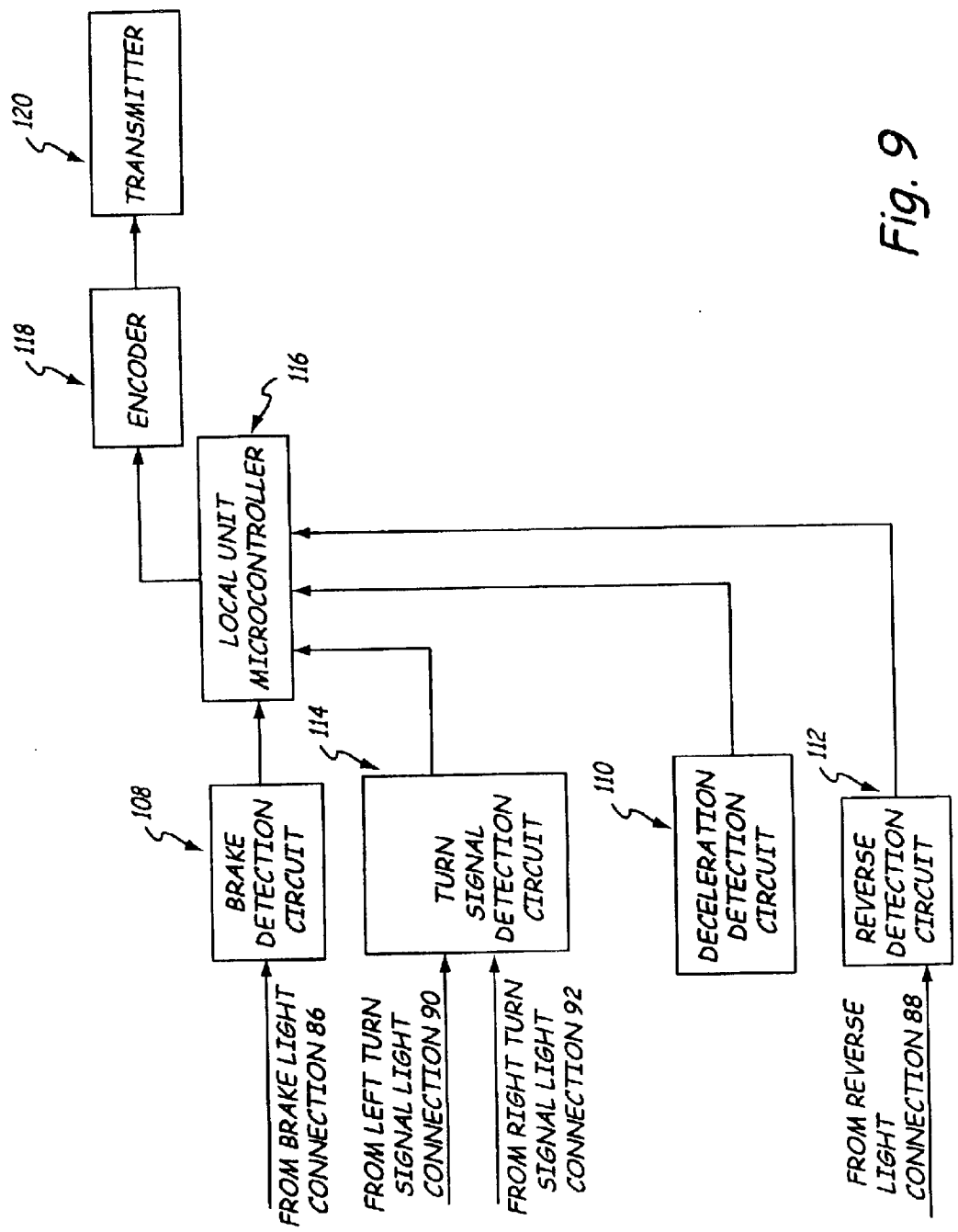
FIG. 9 is block diagram of the local unit of the second embodiment of the present invention.

FIG. 9 is a block diagram of elements of local unit 74, located within local unit casing 83, containing brake detection circuit 108, deceleration detection circuit 110, reverse detection circuit 112, turn signal detection circuit 114, local unit microcontroller 116, encoder 118, and transmitter 120.

Brake detection circuit 108, deceleration detection circuit 110, reverse detection circuit 112, and turn signal detection circuit 114 are connected to and send signals to local unit microcontroller 116. Brake detection circuit 108 has a second end connected to and capable of receiving electrical current from brake light connection 86. Turn signal detection circuit has two second ends connected to and capable of receiving electrical current from left turn signal light connection 90 and right turn signal light connection 92. Reverse detection circuit 112 has a second end connected to and capable of receiving electrical current from reverse light connection 88. Local unit microcontroller 116 is also connected to encoder 118. Local unit microcontroller 116 is programmed to detect and interpret signals from brake detection circuit 108, deceleration detection circuit 110, reverse detection circuit 112, and turn signal detection circuit 114. When a signal is received, local unit microcontroller 116 interprets the signal and produces a corresponding output to encoder 118.

Brake detection circuit 108 detects when vehicle 68 is braking. When the brakes of vehicle 68 are activated, an electrical current is sent through the brake light circuit of vehicle 68, allowing tail lights 70 to illuminate continuous brake lights. When local unit 74 is connected to the brake light system of vehicle 68 via brake light connection 86, the electrical current is also sent to brake detection circuit 108 via brake light connection 86. If brake detection circuit 108 detects the electrical current, brake detection circuit 108 sends a signal to local unit microcontroller 116 that vehicle 68 is braking.

Deceleration detection circuit 110 detects deceleration of vehicle 68 decelerates through the use of an acceleration detector positioned in a nose-tail direction of vehicle 68. The acceleration detector is preferably an accelerometer, which measures deceleration when deceleration occurs. The force measured is created by an inertial resistance to the deceleration of an object. When deceleration occurs, the object shifts from its neutral position because of its inertia. The distance the object moves is measured and calculated as an inertial force. Signals regarding the inertial forces are continuously sent from deceleration detection circuit 110 to local unit microcontroller 116.

Upon receiving signals regarding deceleration, local unit microcontroller 116 compares the inertial forces to a deceleration force threshold. The deceleration force threshold is a parameter programmed into local unit microcontroller 116 and is set at a particular inertial force level so that low rates of deceleration do not trigger a deceleration warning light. As vehicle 68 decelerates, deceleration detection circuit 10 measures the inertial forces, which are compared to the deceleration force threshold at local unit microcontroller 116. If the inertial forces are greater than the deceleration force threshold, then local unit microcontroller 116 produces outputs that vehicle 68 is decelerating rapidly.

Alternatively, the deceleration force threshold may be programmed into deceleration detection circuit 110 instead of local unit microcontroller 116. In such case, the measure inertial forces are compared to the deceleration force threshold at deceleration detection circuit 110. If the inertial forces are greater than the deceleration force threshold, then deceleration detection circuit 110 sends a signal to local unit microcontroller 116 that vehicle 68 is decelerating rapidly.

Reverse detection circuit 112 detects when vehicle 68 is backing up. When vehicle 68 is placed in reverse gear, an electrical current is sent through the reverse light circuit of vehicle 68, allowing tail lights 70 to produce continuous backing up lights. When local unit 74 is connected to the reverse light system of vehicle 68 via reverse light connection 88, the electrical current is also sent to reverse detection circuit 112 via reverse light connection 88. If reverse detection circuit 112 detects the electrical current, brake detection circuit 156 sends a signal to local unit microcontroller 116 that vehicle 68 is placed in reverse gear for backing up.

Alternatively, local unit 74 may detect reverse operation through the acceleration detector used in deceleration detection circuit 110 in a similar manner to deceleration/reverse detection circuit 46 of the first embodiment of the present invention, as described in FIG. 4. In such case, local unit microcontroller 116 would further compare the inertial force signal to an upper reverse force threshold and a lower reverse force threshold defining a reverse operation range, wherein the reverse operation range is substantially less than the deceleration force threshold. If the inertial force falls within this range, then local unit microcontroller 116 produces an output that vehicle 68 is backing up. With this alternative, local unit 74 does not need to be connected to the reverse light circuit of vehicle 68 via reverse light connection 88.

Turn signal detection circuit 114 detects when the turn signals of vehicle 68 are activated. When either the left turn signal or the right turn signal of vehicle 68 is activated, an electrical current is sent through the respective turn signal light circuit of vehicle 68, allowing the respective light of tail lights 70 to blink. When local unit 74 is connected to the left and right turn signal light circuits of vehicle 68 via left turn signal light connection 90 and right turn signal light connection 92, the electrical current is also sent to turn signal detection circuit 114 via left turn signal light connection 90 or right turn signal light connection 92. If turn signal detection circuit 114 detects an electrical current from left turn signal light connection 90, turn signal detection circuit 114 sends a first signal to local unit microcontroller 116 that the left turn signal of vehicle 68 is activated. Correspondingly, if turn signal detection circuit 114 detects an electrical current from right turn signal light connection 92, turn signal detection circuit 114 sends a second signal to local unit microcontroller 116 that the right turn signal of vehicle 68 is activated.

When local unit microcontroller 116 receives signals from brake detection circuit 108, deceleration detection circuit 110, reverse detection circuit 112, or turn signal detection circuit 114, local unit microcontroller 116 produces an output to encoder 118 corresponding to the signal received.

Encoder 118 is a signal encoder, which is commonly used in remote control systems. A signal encoder digitally encodes signals before the signals are sent to a transmitter, such as transmitter 120. The signals are encoded so that signals emitted by transmitter 120 are only interpreted by a corresponding decoder. An encoder and corresponding decoder are set to identical digital encoding codes. Only signals from encoders and decoders with identical digital encoding/decoding codes may be decoded for use. This prevents signals emitted from interfering with unwanted devices that receive the signals. When local unit microcontroller 116 provides an output to encoder 118, such as an output that the brakes of vehicle 68 are activated, encoder 118 encodes the output and then sends the encoded signal to transmitter 120.

Transmitter 120 is a wireless communication transmitter, preferrably a radio-frequency (RF) transmitter, connected to and capable of receiving encoded signals from encoder 118. Transmitters receive encoded signals from encoders and emit the encoded signals as wireless transmissions. As such, when transmitter 120 receives an encoded signal from encoder 118, transmitter 120 emits the encoded signal as a wireless transmission. The wireless transmission is then received by left remote unit 76 and right remote unit 78. The use of transmitter 120 avoids the need for a burdensome wire connection between local unit 74 and left remote unit 76 and right remote unit 78 while still allowing a reliable signal transfer.

Local unit 74 provides for the ability to detect operating conditions regarding motor vehicle 68, such as braking, deceleration, reverse operation, and turn signal operation. Upon detecting these operating conditions, local unit 74 emits corresponding wireless transmissions to left remote unit 76 and right remote unit 78. Therefore, local unit 74 is an efficient device for detecting potentially hazardous situations surrounding vehicle 68 and for transmitting such detections.

Figure 10:
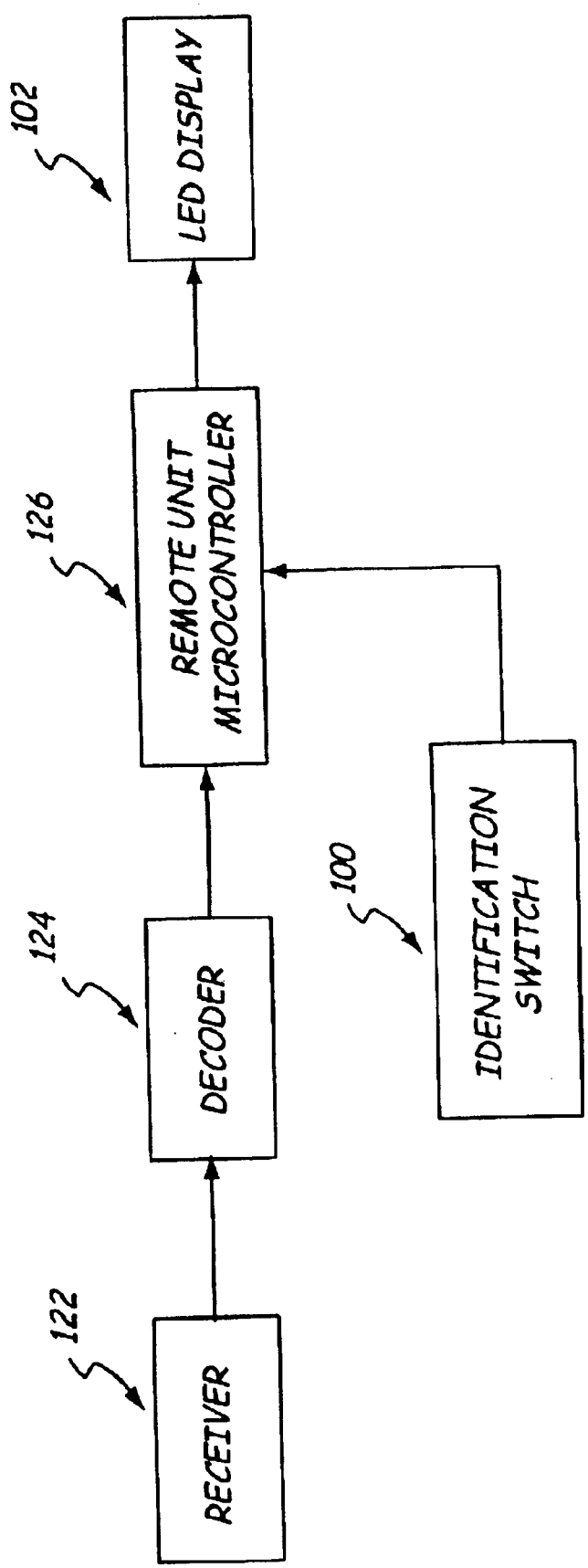
FIG. 10 is a block diagram of the remote unit of the second embodiment of the present invention.

FIG. 10 is a block diagram of elements of a remote unit corresponding to left remote unit 76 and right remote unit 78, located within remote unit casing 104, containing receiver 122, decoder 124, identification switch 100, remote unit microcontroller 126, and LED display 102. Receiver 122, decoder 124, and remote unit microcontroller 126 are components of internal circuitry 96 in FIG. 8. Receiver 122 is connected to and sends encoded signals to decoder 124. Decoder 124 is connected to and sends signals to remote unit microcontroller 126. Identification switch 100 is connected to and directs remote unit microcontroller 126. Remote unit microcontroller 126 is connected to and produces outputs to LED display 102.

Receiver 122 is a receiver that receives wireless transmissions emitted from transmitter 120 and converts the wireless transmissions into electrical signals. The electrical signals are then decoded by decoder 124. In order to decode encoded signals sent from local unit 74, decoder 124 and encoder 118 must have identical digital encoding/decoding codes. When multiple remote units are incorporated, as illustrated in FIG. 6, each remote unit uses the same decoding code that corresponds to the encoding code of local unit 74. This allows left remote unit 76 and right remote unit 78 to respond to the wireless transmissions of local unit 74. The signals that result from the decoding are then sent from decoder 124 to remote unit microcontroller 126.

When remote unit microcontroller 126 receives a signal from decoder 124 regarding braking, deceleration, or reverse operation, remote unit microcontroller 126 interprets the signal and produces an output to LED display 102. When remote unit microcontroller 126 receives a signal from decoder 124 regarding activation of a turn signal of vehicle 68, then remote unit microcontroller 126 takes action depending upon the setting of identification switch 100.

If identification switch 100 is set at the "left" setting, as would be in left remote unit 76, then if the signal from decoder 124 regards activation of a left turn signal of vehicle 68, remote unit microcontroller 126 produces an output to LED display 102. Correspondingly, if the signal from decoder 124 regards activation of a right turn signal of vehicle 68, then remote unit microcontroller 126 disregards the signal and does not produce an output to LED display 102.

If identification switch 100 is set at the "right" setting, as would be in right remote unit 78, then if the signal from decoder 124 regards activation of a right turn signal of vehicle 68, remote unit microcontroller 126 produces an output to LED display 102. Correspondingly, if the signal from decoder 124 regards activation of a left turn signal of vehicle 68, then remote unit microcontroller 126 disregards the signal and does not produce an output to LED display 102.

Alternatively, remote unit microcontroller 126 may be programed with a "left" or "right" preset identification. In such case remote unit microcontroller 126 would produce an output to LED display 102 if the signal from decoder 124, regarding a left or right turn signal activation, corresponded to the respective preset identification. Thus, if remote unit microcontroller 126 is programed with a "left" setting and receives a signal from encoder 172 regarding activation of the left turn signal of vehicle 68, then remote unit microcontroller 126 would produce an output to LED display 102. The "right" setting is applied in an analogous manner. This alternative precludes the need for identification switch 100.

LED display 102 emits warning lights from the remote unit to reduce danger by providing visual warnings to following traffic. When LED display 102 receives an output from remote unit microcontroller 126, LED display 102 emits a warning light. Electrical current for LED display 102 is provided by battery 98. As such, LED display 102 acts as a visible warning light. Remote unit microcontroller 126 may also pulse the electrical current sent from battery 98 to LED display 102 to produce a flashing effect. This is useful with deceleration warnings to distinguish them from continuously illuminated brake lights.

Left remote unit 76 and right remote unit 78 provide the ability to receive signals transmitted from local unit 74 to emit warning signals. Such warning signals enhance safety to vehicle 68 and traffic. Additionally, by being wireless, left remote unit 76 and right remote unit 78 are portable and do not require burdensome wire connections.

For an example of an application of the second embodiment of the present invention, assume that vehicle 68 decelerates without the brakes of vehicle 68 being activated. Deceleration detection circuit 154 measures and calculates the corresponding inertial forces, and sends signals regarding the inertial forces to local unit microcontroller 116. Local unit microcontroller 116 then compares the inertial forces to the deceleration force threshold. If vehicle 68 is decelerating fast enough so that the inertial force is greater than the deceleration force threshold, then local unit microcontroller 116 produces an output to encoder 118 that vehicle 68 is decelerating. Encoder 118 then digitally encodes the signal and sends the encoded signal to transmitter 120. Transmitter 120 then emits the encoded signal from local unit 74 as a wireless transmission.

The wireless transmission is intercepted by receiver 122 in both left remote unit 76 and right remote unit 78, and decoded by decoder 124 in each remote unit. For each remote unit, the decoded signal is then sent from decoder 124 to remote unit microcontroller 126. Remote unit microcontroller 126 detects the signal and identifies it as relating to deceleration. Because the signal relates to deceleration, remote unit microcontroller 126 sends a corresponding signal to LED display 102. LED display 102 of each remote unit then flashes a red warning light. As such, left remote unit 76 and right remote unit 78 each flash a red warning light oriented behind trailer 72. Traffic following vehicle 68 will be able to observe the flashing warning lights and identify that vehicle 68 is decelerating. This decreases danger to vehicle 68 and following traffic by providing notice to the following traffic of the rapid deceleration.

If the brakes of vehicle 68 are then activated, brake detection circuit 108 detects the current flowing through the brake light circuit of vehicle 68 via brake light connection 86. Brake detection circuit 108 then sends a signal to local unit microcontroller 116 that the brakes of vehicle 68 are activated. Local unit microcontroller 116 detects and interprets the signal and then produces an output to encoder 118. Preferably, if local unit microcontroller 116 simultaneously detects signals regarding braking and deceleration, local unit microcontroller 116 produces an output regarding braking only. Upon receipt of the output, encoder 118 then digitally encodes the signal and sends the encoded signal to transmitter 120. Transmitter 120 then emits the encoded signal from local unit 74 as a wireless transmission.

The wireless transmission is intercepted by receiver 122 in both left remote unit 76 and right remote unit 78, and decoded by decoder 124 in each remote unit. For each remote unit, the decoded signal is then sent from decoder 124 to remote unit microcontroller 126. Remote unit microcontroller 126 detects the signal and identifies it as relating to braking. Because the signal relates to braking, remote unit microcontroller 126 produces a corresponding output to LED display 102. LED display 38 of each remote unit then emits a continuous red warning light. As such, left remote unit 76 and right remote unit 78 each emit a continuous red warning light oriented behind trailer 72. Traffic following vehicle 68 will be able to observe the warning lights despite the fact that tail lights 70 of vehicle 68 are obstructed by trailer 72. The following traffic will be able to identify that vehicle 68 is braking, thereby enhancing safety to motorists. If vehicle 68 is then placed in reverse gear, reverse detection circuit 112 detects the current flowing through the reverse light circuit of vehicle 68 via reverse light connection 88. Reverse detection circuit 112 then sends a signal to local unit microcontroller 116 that vehicle 68 is placed in reverse gear for backing up. Local unit microcontroller 116 detects and interprets the signal and then produces an output to encoder 118. Upon receipt of the output, encoder 118 then digitally encodes the signal and sends the encoded signal to transmitter 120. Transmitter 120 then emits the encoded signal from local unit 74 as a wireless transmission.

The wireless transmission is intercepted by receiver 122 in both left remote unit 76 and right remote unit 78, and decoded by decoder 124 in each remote unit. For each remote unit, the decoded signal is then sent from decoder 124 to remote unit microcontroller 126. Remote unit microcontroller 126 detects the signal and identifies it as relating to reverse operation. Because the signal relates to reverse operation, remote unit microcontroller 126 produces a corresponding output to LED display 102. LED display 102 of each remote unit then emits a continuous white warning light. As such, left remote unit 76 and right remote unit 78 each emit a continuous white warning light oriented behind trailer 72. Pedestrians and motorists behind vehicle 68 will be able to observe the warning lights despite the fact that tail lights 70 of vehicle 68 are obstructed by trailer 72. The pedestrians and motorists will be able to identify that vehicle 68 is backing up so they may move out of the way if needed.

If the left turn signal of vehicle 68 is activated, turn signal detection circuit 114 detects the current flowing through the left turn signal light circuit of vehicle 68 via left turn signal light connection 104. Turn signal detection circuit 114 then sends a signal to local unit microcontroller 116 that the left turn signal of vehicle 68 is activated. Local unit microcontroller 116 detects and interprets the signal and then produces an output to encoder 118. Upon receipt of the output, encoder 118 then digitally encodes the signal and sends the encoded signal to transmitter 120. Transmitter 120 then emits the encoded signal from local unit 74 as a wireless transmission.

The wireless transmission is intercepted by receiver 122 in both left remote unit 76 and right remote unit 78, and decoded by decoder 124 in each remote unit. For each remote unit, the decoded signal is then sent from decoder 124 to remote unit microcontroller 126. Remote unit microcontroller 126 detects the signal and identifies it as relating to activation of the left turn signal of vehicle 68. From there, remote unit microcontroller 126 takes action depending upon the setting of identification switch 100 in each remote unit. For left remote unit 76, identification switch 100 is set at the "left" setting. For right remote unit 78, identification switch 100 is set at the "right" setting.

Because identification switch 100 in left remote unit 76 is set at the "left" setting, remote unit microcontroller 126 in left remote unit 76 produces a corresponding output to LED display 102 of left remote unit 76. LED display 102 of left remote unit 76 then flashes a yellow turn signal light from left remote unit 76, oriented behind trailer 72. Because identification switch 100 in right remote unit 84 is set at the "right" setting, remote unit microcontroller 126 in right remote unit 84 disregards the signal and does not produce an output to LED display 102 of right remote unit 78. By being able to distinguish between left and right remote units, left remote unit 76 and right remote unit 78 effectively function as turn signals from the rear side of trailer 72. Traffic following vehicle 68 will be able to observe the turn signals despite the fact that tail lights 70 of vehicle 68 are obstructed by trailer 72. The following traffic will be able to identify that vehicle 68 is turning left, thereby enhancing safety to motorists.

If the right turn signal of vehicle 68 is activated, an analogous outcome occurs where right remote unit 78 flashes a yellow turn signal and left remote unit 76 does not. Following traffic will be able to identify that vehicle 68 is turning right, thereby enhancing safety to motorists.

As described in the second embodiment, local unit 74, left remote unit 76, and right remote unit 78 enhance safety to motorists by providing wireless tail lights for towed trailers, which may obstruct the tail lights of the towing vehicle. The use of wireless tail lights gives notice to following traffic of operating conditions of vehicle 68, which decreases the risk of vehicular collisions.

An alternative use of the second embodiment of the present invention is as emergency towing lights. Local unit 74 may be attached to an emergency vehicle, such as a tow truck. When towing other vehicles, left remote unit 76 and right remote unit 78 may be mounted on the towed vehicle to function as wireless tail lights. This alternative precludes the need of a wired connection to the tail lights of the towed vehicle while still providing rear safety lights.

Figure 11:
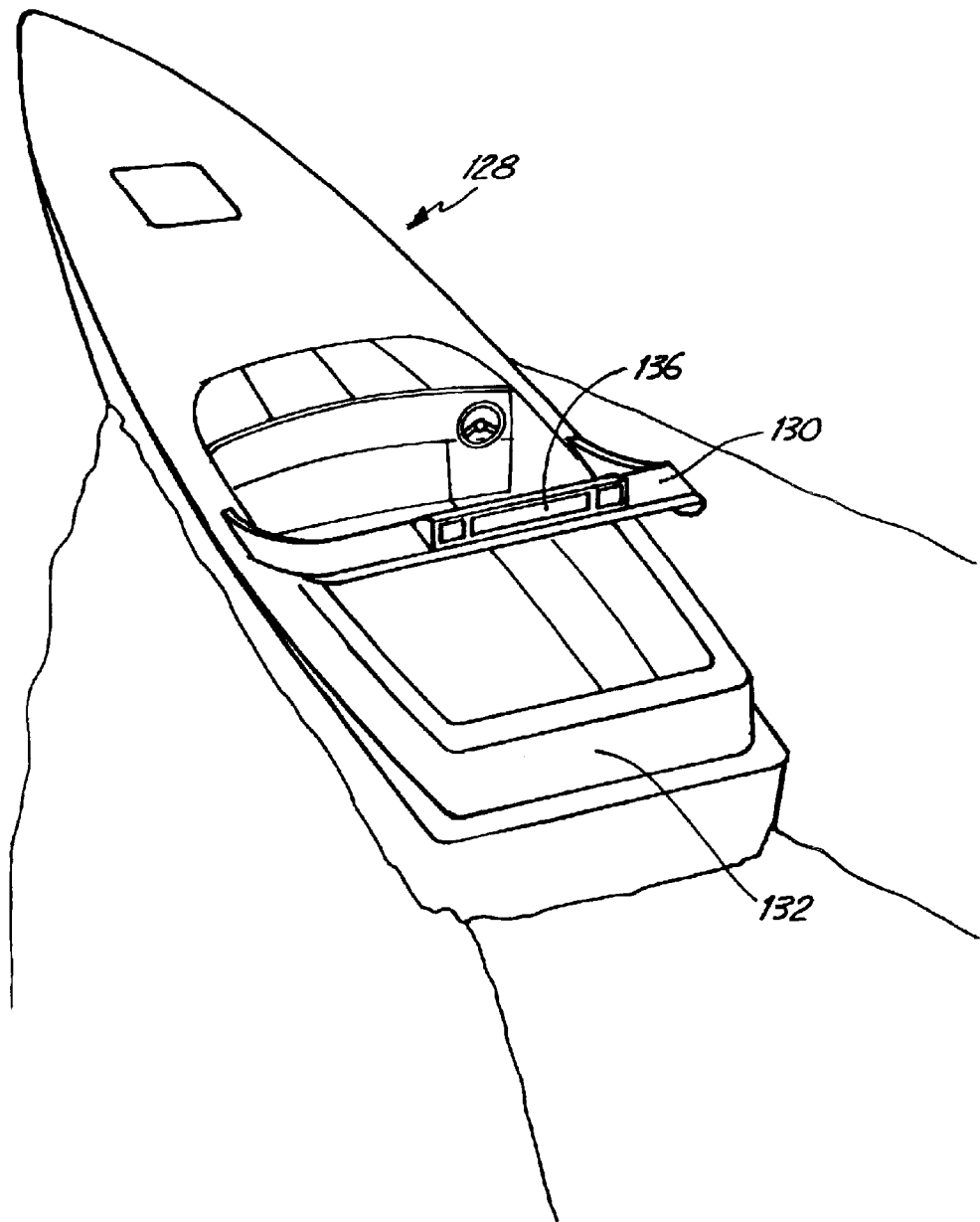
FIG. 11 is an illustration of the third embodiment of the present invention in use.

FIG. 11 is an illustration of the system of a third embodiment of the present invention and includes boat 128, radar arch 130, outer transom 132, local unit of present invention 134, and remote unit of present invention 136. The third embodiment of the present invention is intended to be used with a variety of water craft, providing a rear-oriented deceleration warning light and reverse operation warning light. Boat 128 is a conventional motor boat and includes radar arch 130 and outer transom 132. Radar arch 130 is a standard motor boat radar arch for providing an elevated location for communication equipment. Outer transom 132 is the rear wall of boat 128.

Local unit 134 is attached to boat 128 and is not required to be attached to a specific location on boat 128. Preferably, local unit 134 is mounted in an engine compartment of boat 128, which is typically located under a rear floor board of boat 128. Remote unit 136 is portable relative to boat 128 and may be attached to any suitable location. For example, as illustrated in FIG. 11, remote unit 136 may be attached on top of radar arch 130 of boat 128, providing an elevated position. Alternatively, remote unit 136 may also be connected to outer transom 132 of boat 128.

When local unit 134 detects operating conditions regarding boat 128, such as deceleration or a reverse operation, local unit 134 emits wireless transmissions corresponding to the operating conditions detected. Remote unit 136 then receives the wireless transmissions and produces corresponding warning signals. The types of warning signals emitted by remote unit 136 depend upon the wireless transmissions emitted by local unit 134, which correspondingly depend upon the operating conditions local unit 134 detects.

A first type of warning signal is produced if boat 128 decelerates. If boat 128 is decelerating, local unit 134 detects this and emits corresponding wireless transmissions to remote unit 136. Remote unit 136 then receives the wireless transmissions and flashes a waning light from the top of radar arch 130 to warn following boaters that boat 128 is decelerating. This reduces danger by providing a visible warning to following boaters that boat 128 is decelerating. The deceleration warning is especially useful for boats because boats typically lack warning signals when slowing down.

A second type of warning signal is produced if boat 128 is placed in reverse gear for reverse operation (i.e. backing up). When boat 128 is placed in reverse gear, local unit 134 detects this and produces a reverse operation light from the top of radar arch 130 to warn following boaters that boat 128 is backing up. Typically, boats are also not equipped with reverse operation lights. Remote unit 136, therefore, functions as an elevated reverse operation light for boat 128 for reducing collision dangers when boat 128 is backing up.

Local unit 134 and remote unit 136 enhance safety to boat 128 by detecting operating conditions of boat 128 and producing corresponding warning signals. The warning signals are convenient means for warning other boaters of operating conditions of boat 128, such as deceleration and reverse operation, which minimizes collision dangers and enhance safety to boaters near boat 128.

Figure 12:
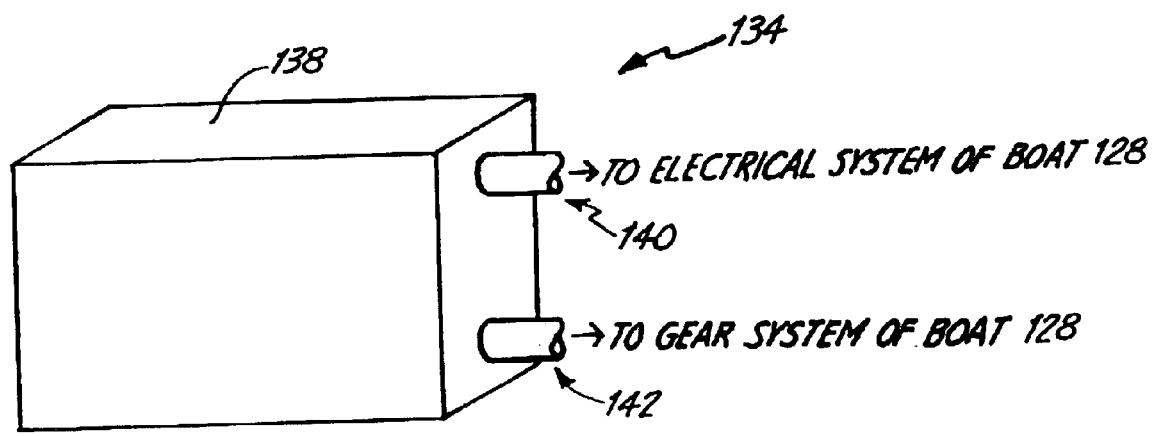
FIG. 12 is a perspective view of the local unit of the third embodiment of the present invention.
Figure 13:
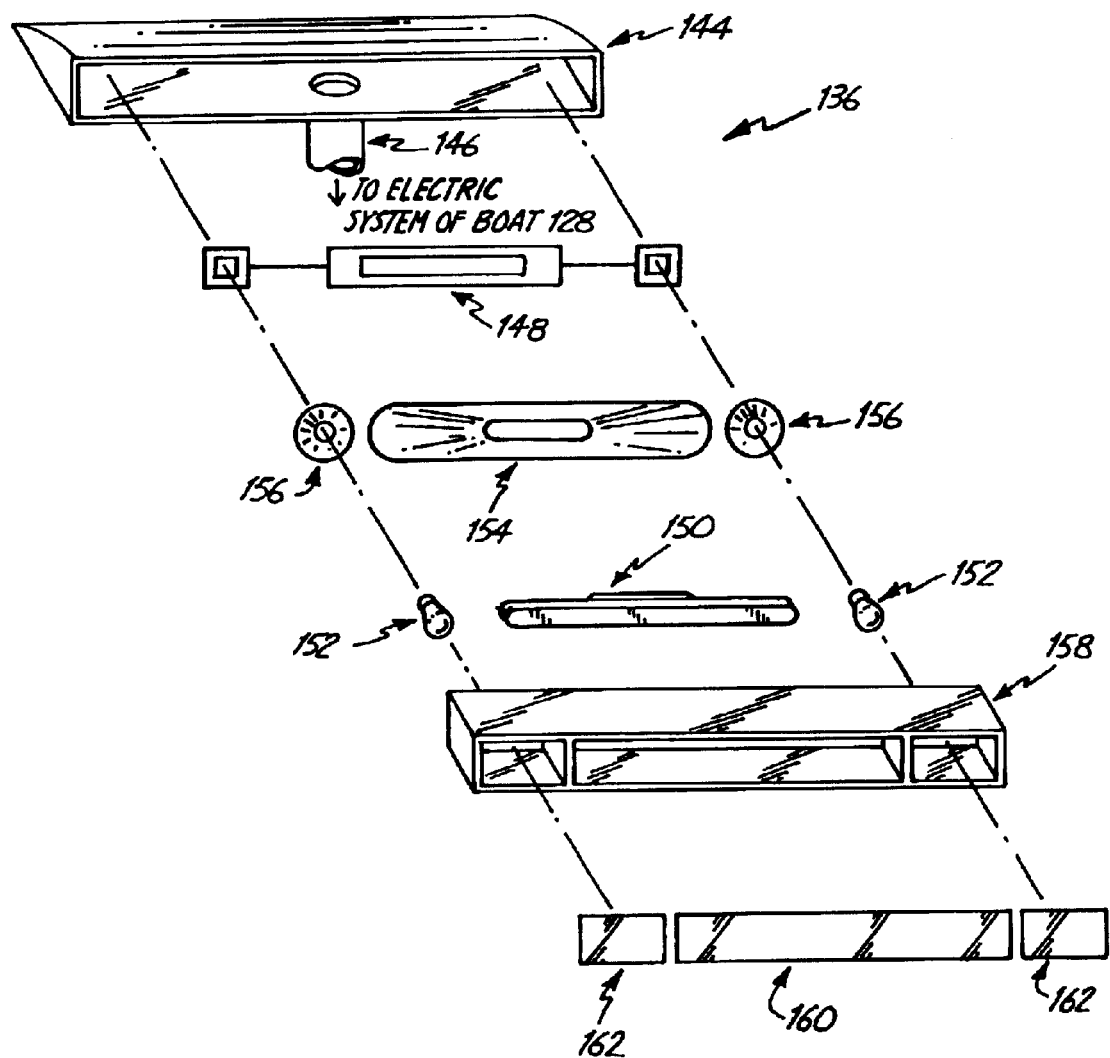
FIG. 13 is an exploded view of the remote unit of the third embodiment of the present invention.

FIGS. 12 and 13 illustrate local unit 134 and remote unit 136 of the present invention. FIG. 12 is a perspective view of external elements associated with local unit 134 including local unit casing 138, battery connection 140, and gear connection 142. Local unit casing 138 encompasses and provides protection for local unit 134. Battery connection 140 has a first end extending into local unit casing 138 and a second end connecting to an electrical system of boat 128. The electrical system of boat 128 is a standard boat battery-powered system. As such, battery connection 140 provides local unit 134 with electrical power.

Gear connection 142 has a first end extending into local unit casing 138 and a second end connecting to a gear control circuit of boat 128. The gear control circuit of boat 128 is a standard forward-reverse gear circuit for boats. Unlike automobiles, boats typically only have a forward and reverse gear, which is controlled by an electrical circuit. Gear connection 142 allows local unit 134 to monitor the gear control system of boat 128 for detecting when the gear control circuit is directed to place boat 128 in reverse gear.

By being interconnected with boat 128, local unit 134 is capable of detecting operating conditions of boat 128 and emit wireless transmissions to remote unit 136 regarding the detected operating conditions. This allows remote unit 136 to provide corresponding warning signals to reduce collision dangers to boaters.

FIG. 13 is an exploded view of remote unit 136 including remote unit base 144, battery connection 146, internal circuitry 148, reverse light 150, deceleration lights 152, reverse light reflector 154, deceleration light reflectors 156, remote unit casing 158, reverse light translucent cover 160, and deceleration light translucent covers 162. Remote unit base 144, is the portion of remote unit 136 that is attached on top of radar arch 130 in FIG. 11. Remote unit base 144 may be attached to an intended surface by any conventional means, such as fasteners, adhesives, and magnets. Remote unit 136 is preferably connected to the electrical system of boat 128. Battery connection 146 has a first end extending into remote unit base 144 and a second end connecting to the electrical system of boat 128, for providing power to remote unit 136. While remote unit 136 may be powered by internal batteries, such as illustrated in the first and second embodiments of the present invention, reverse light 150 and deceleration lights 152 are high powered bulbs relative to LEDs and would rapidly drain an internal battery. As such, remote unit 136 is preferably connected to the electrical system of boat 128 through radar arch 130 via battery connection 146.

Internal circuitry 148 is attached inside remote unit base 144 and is connected to battery connection 146 for power. Internal circuitry 148 also provides connections for reverse light 150 and deceleration lights 152. Remote unit casing 158 is attached to remote unit base 144 and completely encases internal circuitry 148, reverse light 150, deceleration lights 152, reverse light reflector 154, and deceleration light reflectors 156. Remote unit casing 158 is attached to remote unit base 144 such that remote unit casing 158 is detachable and reattachable to allow access inside remote unit 136 to reach and replace reverse light 150 and deceleration lights 152. Remote unit casing 158 provides protection for remote unit 136 and contains an opening that is covered by reverse light translucent cover 160 and deceleration light translucent covers 162. Reverse light translucent cover 160 and deceleration light translucent covers 162 consist of translucent materials to allow light from reverse light 150 and deceleration lights 152 to be visibly observable, and also provides protection for remote unit 136.

Warning signals produced from remote unit 136 are provided by reverse light 150 and deceleration lights 152, which illustrate the preferred warning devices incorporated in remote unit 136. However, the present invention is not intended to be limited to a set number of lights or particular colors. Reverse light 150 is a conventional high-powered white light for producing a white reverse operation light when boat 128 is backing up. Reverse light 150 is backed by reverse light reflector 154, which is a standard light reflector for scattering light produced by reverse light 150. Reverse light reflector 154 is positioned between internal circuitry 148 and reverse light 150 and, due to its reflective surface, allows remote unit 136 to use a lower powered bulb for reverse light 150 to minimize power usage, without reducing light intensity.

Deceleration lights 152 are conventional high-powered red bulbs for producing red deceleration lights when boat 128 is decelerating. Deceleration lights 152 are backed by deceleration light reflectors 156, which are also standard light reflectors for scattering light produced by deceleration lights 152. Deceleration light reflectors 156 are positioned between internal circuitry 148 and deceleration lights 152, and also allow remote unit 136 to use lower powered bulbs for deceleration lights 152 to minimize power usage, without reducing light intensity.

Alternatively, reverse light 150 and deceleration lights 152 may be clear bulbs, wherein reverse light translucent cover 160 is white and deceleration light translucent covers 162 are red. In either alternative, the result provides red visual warnings for deceleration and white visual warnings for reverse operation.

When a wireless transmission is emitted from local unit 134 to remote unit 136, internal circuitry 148 receives and interprets the wireless transmission. If the wireless transmission regards deceleration of boat 128, then internal circuitry 148 directs deceleration lights 152 to provide red deceleration lights. If the wireless transmission regards a reverse operating motion of boat 128, then internal circuitry 148 directs reverse light 150 to provide an continuous white reverse light. As such, remote unit 136 provides for the ability to receive wireless transmissions from local unit 134 regarding operating conditions of boat 128, and to produce corresponding warning signals to enhance boating safety.

Figure 14:
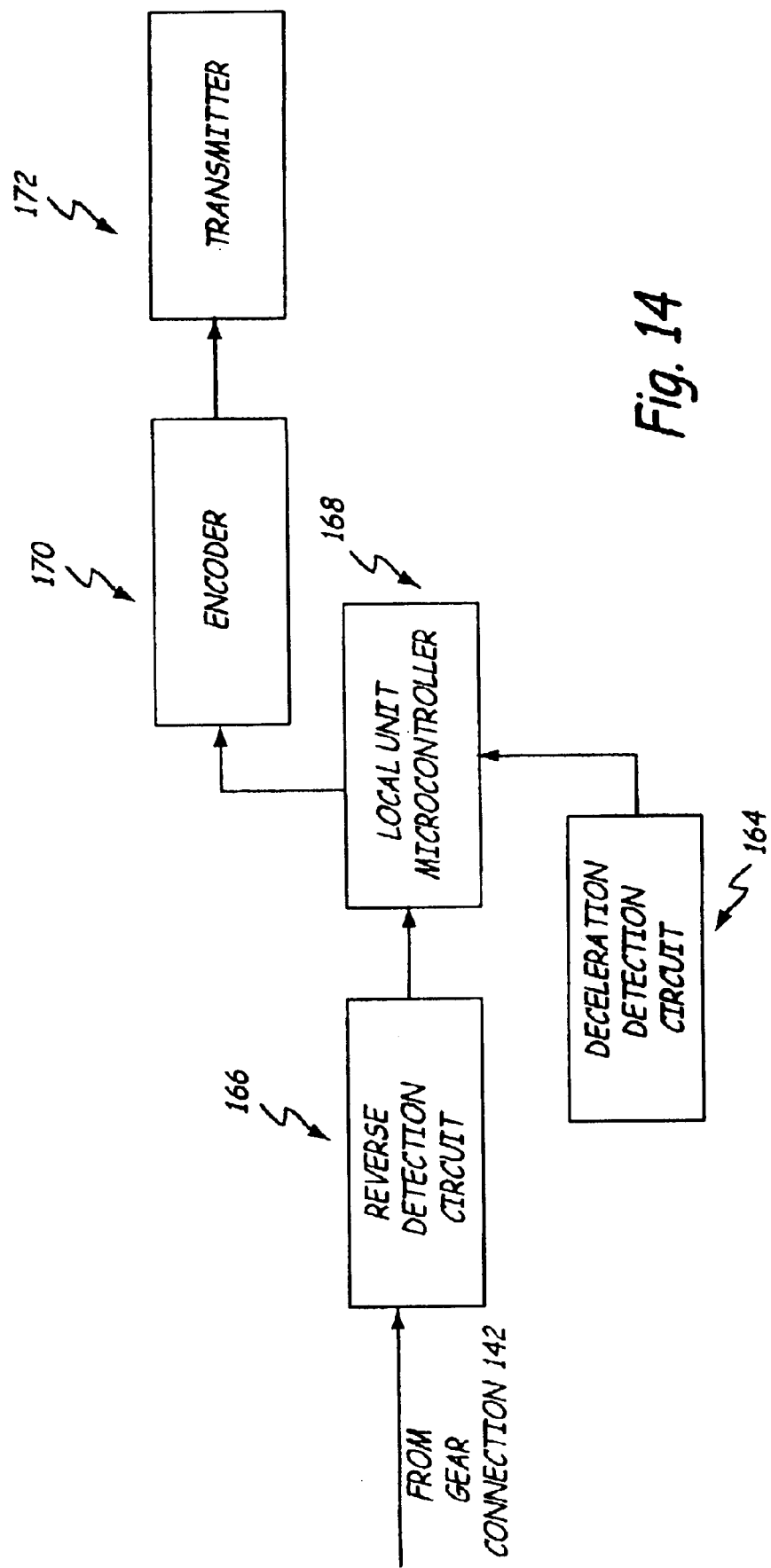
FIG. 14 is block diagram of the local unit of the third embodiment of the present invention.

FIG. 14 is a block diagram of elements of local unit 134, located within local unit casing 138, including deceleration detection circuit 164, reverse detection circuit 166, local unit microcontroller 168, encoder 170, and transmitter 172. Deceleration detection circuit 164 and reverse detection circuit 166 are connected to and send signals to local unit microcontroller 168. Reverse detection circuit 166 has a second end connected to and capable of receiving electrical current from gear connection 142. Local unit microcontroller 168 is also connected to encoder 170. Local unit microcontroller 168 is programmed to detect and interpret signals from deceleration detection circuit 164 and reverse detection circuit 166 and produce corresponding outputs to encoder 170. Encoder 170 is also connected to transmitter 172.

Deceleration detection circuit 164 detects deceleration of boat 128 through the use of an acceleration detector positioned in a nose-tail direction of boat 128. The acceleration detector is preferably an accelerometer, which measures deceleration by measuring force exerted on an object, such as a suspended weight, when deceleration occurs. The force measured is created by an inertial resistance to the deceleration of the object. When deceleration occurs, the object shifts from its neutral position because of its inertia. The distance the weight moves is measured and calculated as an inertial force. Signals regarding the inertial forces are continuously sent from deceleration detection circuit 164 to local unit microcontroller 168.

Upon receiving signals regarding deceleration, local unit microcontroller 168 compares the inertial forces to a deceleration force threshold. The deceleration force threshold is a parameter programmed into local unit microcontroller 168 and is set at a particular inertial force level so that low rates of deceleration do not trigger a deceleration warning light. As boat 128 decelerates, deceleration detection circuit 164 measures the inertial forces, which are compared to the deceleration force threshold at local unit microcontroller 168. If the inertial forces are greater than the deceleration force threshold, then local unit microcontroller 168 produces outputs that boat 128 is decelerating rapidly.

Alternatively, the deceleration force threshold may be programmed into deceleration detection circuit 164 instead of local unit microcontroller 168. In such case, the measured inertial forces are compared to the deceleration force threshold at deceleration detection circuit 164. If the inertial forces are greater than the deceleration force threshold, then deceleration detection circuit 164 sends a signal to local unit microcontroller 168 that boat 128 is decelerating rapidly.

Reverse detection circuit 166 detects when boat 128 is backing up. When boat 128 is placed in reverse gear, an electrical signal is sent through the gear control circuit of boat 128, instructing boat 128 to switch to reverse gear. When local unit 134 is connected to the gear control circuit of boat 128 via gear connection 142, the electrical signal is also sent to reverse detection circuit 166 via gear connection 142. If reverse detection circuit 166 detects the electrical signal, brake detection circuit 242 sends a signal to local unit microcontroller 168 that boat 128 is placed in reverse gear and is backing up.

Alternatively, local unit 134 may detect reverse operation through the acceleration detector used in deceleration detection circuit 164 in a similar manner to deceleration/reverse detection circuit 46 of the first embodiment of the present invention, as described in FIG. 4. In such case, local unit microcontroller 168 would further compare the inertial force signal to an upper reverse force threshold and a lower reverse force threshold defining a reverse operation range, wherein the reverse operation range is substantially less than the deceleration force threshold. If the inertial force falls within this range, then local unit microcontroller 168 produces an output that boat 128 is backing up. With this alternative, local unit 134 does not need to be connected to the gear control circuit of boat 128 via gear connection 142.

When local unit microcontroller 168 receives signals from deceleration detection circuit 164 or reverse detection circuit 166, local unit microcontroller 168 produces an output to encoder 170 corresponding to the signal received. Encoder 170 is a signal encoder, which is commonly used in remote control systems. A signal encoder digitally encodes signals before the signals are sent to a transmitter, such as transmitter 172. The signals are encoded so that signals emitted by transmitter 172 are only interpreted by a corresponding decoder. An encoder and corresponding decoder are set to identical digital encoding codes. Only signals from encoders and decoders with identical digital encoding/decoding codes maybe be decoded for use. This prevents signals emitted from interfering with unwanted devices that receive the signals. When local unit microcontroller 168 provides an output to encoder 170, encoder 170 encodes the output and then sends the encoded signal to transmitter 172.

Transmitter 172 is a wireless communication transmitter, preferably a radio-frequency (RF) transmitter, connected to and capable of receiving encoded signals from encoder 170. Transmitters receive encoded signals from encoders and emit the encoded signals as wireless transmissions. As such, when transmitter 172 receives an encoded signal from encoder 170, transmitter 172 emits the encoded signal as a wireless transmission. The wireless transmission is then received by remote unit 136. The use of transmitter 172 avoids the need for a burdensome wire connection between local unit 134 and remote unit 136 while still allowing a reliable signal transfer.

Local unit 134 provides for the ability to detect operating conditions regarding boat 128, such as deceleration and reverse operation. Upon detecting the operating conditions, local unit 134 emits corresponding wireless transmissions to remote unit 136. As such, local unit 134 is a convenient and efficient device to detect potentially hazardous situations and transmit such detections.

FIG. 15 is a block diagram of elements of remote unit 136, located within remote unit casing 158, containing receiver 174, decoder 176, remote unit microcontroller 178, reverse light 150, and deceleration lights 152. Receiver 174, decoder 176, and remote unit microcontroller 178 are components of internal circuitry 148 in FIG. 13. Receiver 174 is connected to and sends encoded signals to decoder 176. Decoder 176 is connected to and send signals to remote unit microcontroller 178. Remote unit microcontroller 178 is connected to and produces outputs to reverse light 150 and deceleration lights 152.

Receiver 174 is a receiver that receives wireless transmissions emitted from transmitter 172 and converts the wireless transmissions into electrical signals. The electrical signals are then decoded by decoder 176. In order to decode encoded signals sent from local unit 134, decoder 176 and encoder 170 must have identical digital encoding/decoding codes. The signals that result from the decoding are then sent from decoder 176 to remote unit microcontroller 178.

When remote unit microcontroller 178 receives signals from decoder 176, remote unit microcontroller 178 interprets the signals and produces outputs to reverse light 150 and/or deceleration lights 152. Reverse light 150 and deceleration lights 152 emit warning lights from remote unit 136 to reduce danger by providing visual warnings to following boaters. When reverse light 150 receives outputs from remote unit microcontroller 178, reverse light 150 emits a warning light. Correspondingly, when deceleration lights 152 receive outputs from remote unit microcontroller 178, deceleration lights 152 emit warning lights. Electrical current for reverse light 150 and deceleration lights 152 is provided by the electric system of boat 128 via battery connection 146. Deceleration lights 152 may also be flashed. Remote unit microcontroller 178 may pulse the electrical current sent from battery connection 146 to deceleration lights 152. This results in a flashing effect from deceleration lights 152 and is useful with deceleration warnings.

Remote unit 136 provides the ability to receive signals transmitted from local unit 134 to emit output warning signals. Such warning signals enhance safety to boaters when boat 128 decelerates rapidly or is backing up.

For an example of an application of the third embodiment of the present invention, assume that boat 128 decelerates rapidly. Deceleration detection circuit 164 measures and calculates the corresponding inertial forces, and sends signals regarding the inertial forces to local unit microcontroller 168. Local unit microcontroller 168 then compares the inertial forces to the deceleration force threshold. If boat 128 is decelerating fast enough so that the inertial force is greater than the deceleration force threshold, then local unit microcontroller 168 produces an output to encoder 170 that boat 128 is rapidly decelerating. Encoder 170 then digitally encodes the signal and sends the encoded signal to transmitter 172. Transmitter 172 then emits the encoded signal from local unit 134 as a wireless transmission.

The wireless transmission is intercepted by receiver 174 in remote unit 136 and decoded by decoder 176. The decoded signal is then sent from decoder 176 to remote unit microcontroller 178. Remote unit microcontroller 178 detects the signal and identifies it as relating to deceleration. Because the signal relates to deceleration, remote unit microcontroller 178 sends a corresponding signal to deceleration lights 152. Deceleration lights 152 then flash red warning lights from an elevated position on radar arch 130, oriented behind boat 128.

Boaters following boat 128 will be able to observe the flashing warning lights and identify that boat 128 is rapidly decelerating. This decreases danger to boat 128 and following boaters by providing notice to the following boaters of the rapid deceleration.

If boat 128 is placed in reverse gear, reverse detection circuit 166 detects the electrical signal through the gear control circuit of boat 128 via gear connection 142. Reverse detection circuit 214 then sends a signal to local unit microcontroller 168 that boat 128 is placed in reverse gear for backing up. Local unit microcontroller 168 detects and interprets the signal and then produces an output to encoder 170. Upon receipt of the output, encoder 170 then digitally encodes the signal and sends the encoded signal to transmitter 172. Transmitter 172 then emits the encoded signal from local unit 134 as a wireless transmission.

The wireless transmission is intercepted by receiver 174 in remote unit 136 and decoded by decoder 176. The decoded signal is then sent from decoder 176 to remote unit microcontroller 178. Remote unit microcontroller 178 detects the signal and identifies it as relating to reverse operation. Because the signal relates to reverse operation, remote unit microcontroller 126 produces a corresponding output to reverse light 150. Reverse light 150 then emits a continuous white warning light from an elevated position on radar arch 130, oriented behind boat 128. Boaters following boat 128 will be able to observe the reverse operation warning light and identify that boat 128 is backing up. This decreases danger to boat 128 and following boaters by providing notice to the following boaters that boat 128 is backing up.

As described in the third embodiment, local unit 134 and remote unit 136 decrease danger to boaters by providing warning signals regarding operating conditions of boat 128. These warning signals provide notice to following boaters of potentially hazardous situations to decrease the risk of loss of property, injuries, and fatalities.

Although the present invention has been described with reference to preferred embodiments, workers skilled in the art will recognize that changes may be made in form and detail without departing from the spirit and scope of the invention. Operating conditions detected and warning signals produced as illustrated in the preferred embodiments are not intended to be limited to the combinations described. For example, a remote unit incorporating a proximity detection circuit as described in the first embodiment may be used with a local unit attached to a boat as described in the third embodiment. Such a combination is useful when the remote unit is attached to a helmet or life jacket for water skiers. The remote unit can produce visual warning signals when the boat decelerates or backs up. The remote unit may also produce a visual warning signal when the water skier moves a predetermined distance away from the boat, such as when the water skier falls down. The visual warning signal identifies the location of the fallen water skier, allowing the towing boat to find the water skier, and providing notice to other boaters to avoid boating in that location. Such a combination exemplifies another beneficial use of the present invention for increasing safety in potentially hazardous situations.

What is claimed is:

1. A vehicle safety system comprising:
a local unit, attached to an associated vehicle, for detecting operating conditions regarding the associated vehicle, and for emitting wireless transmissions based upon the operating conditions detected, wherein the operating conditions comprise an activation of a braking system of the associated vehicle and a movement of the associated vehicle when the associated vehicle is not running; and
a remote unit for receiving the wireless transmissions from the local unit and for producing warning signals based upon the wireless transmissions received.

2. A vehicle safety system of claim 1, wherein the local unit comprises:
a brake detector for detecting an activation of the braking system of the associated vehicle;
a theft detector for detecting a movement of the associated vehicle when the associated vehicle is not running;
a local unit microcontroller responsive to the brake detector and the theft detector for producing first outputs based upon signals received from the brake detector and second outputs based upon the signals received from the theft detector;
a horn output device responsive to the second outputs from the local unit microcontroller for producing outputs to a horn of the associated vehicle based upon the second outputs received;
an encoder responsive to the first outputs from the local unit microcontroller for producing encoded signals based upon the first outputs received; and
a transmitter responsive to the encoded signals from the encoder for emitting the encoded signals as the wireless transmissions.

3. A vehicle safety system of claim 2, wherein the remote unit comprises:
a receiver responsive to the wireless transmissions emitted from the local unit for producing encoded signals based upon the wireless transmissions received;
a decoder responsive to the encoded signals from the receiver for producing decoded signals;
a remote unit microcontroller responsive to the decoded signals from the decoder for producing outputs based upon the decoded signals received; and
a warning signal producing device responsive to the outputs from the remote unit microcontroller for producing signals based upon the outputs as the warning signals.

4. A vehicle safety system of claim 3, wherein the operating conditions further comprise deceleration of the associated vehicle, wherein the local unit further comprises a deceleration detector for detecting deceleration of the associated vehicle, and wherein the local unit microcontroller is further responsive to the deceleration detector for further producing first outputs based upon signals received from the deceleration detector.

5. A vehicle safety system of claim 4, wherein the operating conditions further comprise rotations-per-minute of an engine of the associated vehicle, wherein the local unit further comprises a rotations-per-minute detector for detecting rotations-per-minute of the engine of the associated vehicle, and wherein the local unit microcontroller is further responsive to the rotations-per-minute detector for further producing first outputs based upon signals received from the rotations-per-minute detector.

6. A vehicle safety system of claim 3, wherein the remote unit further comprises a proximity detector for producing transmission field strength signals, and wherein the remote unit microcontroller is further responsive to the transmission field strength signals from the proximity detector for further producing outputs based upon the transmission field strength signals received.

7. A vehicle safety system of claim 6, wherein the operating conditions further comprise deceleration of the associated vehicle, wherein the local unit further comprises a deceleration detector for detecting deceleration of the associated vehicle, and wherein the local unit microcontroller is further responsive to the deceleration detector for further producing first outputs based upon signals received from the deceleration detector.

8. A vehicle safety system of claim 3, wherein:
the remote unit further comprises:
an input microphone, wherein the remote unit microcontroller is further responsive to the input microphone for producing communication outputs based upon the signals received from the input microphone; and
a remote unit transmitter responsive to the communication outputs from the remote unit microcontroller for wirelessly emitting the communication outputs; and the local unit further comprises a local unit receiver responsive to the communication outputs emitted from the remote unit for producing signals based upon the communication outputs received, wherein the local unit microcontroller is further responsive to the local unit receiver for producing first outputs based upon the signals received from the local unit receiver.

9. A vehicle safety system comprising:
a local unit, attached to an associated vehicle, for detecting operating conditions regarding the associated vehicle, and for emitting wireless transmissions based upon the operating conditions detected, wherein the operating conditions comprise an activation of a braking system of the associated vehicle and a reverse operation of the associated vehicle; and
a remote unit for receiving the wireless transmissions from the local unit and for producing warning signals based upon the wireless transmissions received.

10. A vehicle safety system of claim 9, wherein the local unit comprises:
a brake detector for detecting an activation of the braking system of the associated vehicle;
a reverse detector for detecting a reverse operation of the associated vehicle;
a local unit microcontroller responsive to the brake detector and the reverse detector for producing outputs based upon signals received from the brake detector and the reverse detector;
an encoder responsive to the outputs from the local unit microcontroller for producing encoded signals based upon the outputs received; and
a transmitter responsive to the encoded signals from the encoder for emitting the encoded signals as the wireless transmissions.

11. A vehicle safety system of claim 10, wherein the remote unit comprises:
a receiver responsive to the wireless transmissions emitted from the local unit for producing encoded signals based upon the wireless transmissions received;
a decoder responsive to the encoded signals from the receiver for producing decoded signals;
a remote unit microcontroller responsive to the decoded signals from the decoder for producing outputs based upon the decoded signals received; and
a warning signal producing device responsive to the outputs from the remote unit microcontroller for producing signals based upon the outputs as the warning signals.

12. A vehicle safety system of claim 11, wherein the operating conditions further comprise an activation of a turn signal of the associated vehicle, wherein the local unit further comprises a turn signal detector for detecting an activation of a turn signal of the associated vehicle, and wherein the local unit microcontroller is further responsive to the turn signal detector for further producing outputs based upon signals received from the turn signal detector.

13. A vehicle safety system of claim 11 further comprising a second remote unit for receiving the wireless transmissions emitted from the local unit and for producing additional warning signals based upon the wireless transmissions received, comprising:
a receiver responsive to the wireless transmissions emitted from the local unit for producing encoded signals based upon the wireless transmissions received;
a decoder responsive to the encoded signals from the receiver for producing decoded signals;
a remote unit microcontroller responsive to the decoded signals from the decoder for producing outputs based upon the decoded signals received; and
warning signal producing device responsive to the outputs from the remote unit microcontroller for producing signals based upon the outputs as the additional warning signals.

14. A vehicle safety system of claim 13, wherein the operating conditions further comprise an activation of a turn signal of the associated vehicle, wherein the local unit further comprises a turn signal detector for detecting an activation of a turn signal of the associated vehicle, and wherein the local unit microcontroller is further responsive to the turn signal detector for further producing outputs based upon signals received from the turn signal detector.

15. A vehicle safety system comprising:
a local unit, attached to an associated vehicle, for detecting operating conditions regarding the associated vehicle, and for emitting wireless transmissions based upon the operating conditions detected, wherein the operating conditions comprise deceleration of the associated vehicle and a reverse operating motion of the associated vehicle; and
a remote unit for receiving the wireless transmissions from the local unit and for producing warning signals based upon the wireless transmissions received.

16. A vehicle safety system of claim 15, wherein the local unit comprises:
a deceleration detector for detecting deceleration of the associated vehicle;
a reverse detector for detecting a reverse operation of the associated vehicle;
a local unit microcontroller responsive to the deceleration detector and the reverse detector for producing outputs based upon signals received from the deceleration detector and the reverse detector;
an encoder responsive to the outputs from the local unit microcontroller for producing encoded signals based upon the outputs received; and
a transmitter responsive to the encoded signals from the encoder for emitting the encoded signals as the wireless transmissions.

17. A vehicle safety system of claim 16, wherein the remote unit comprises:
a receiver responsive to the wireless transmissions emitted from the local unit for producing encoded signals based upon the wireless transmissions received;
a decoder responsive to the encoded signals from the receiver for producing decoded signals;
a remote unit microcontroller responsive to the decoded signals from the decoder for producing outputs based upon the decoded signals received; and
a warning signal producing device responsive to the outputs from the remote unit microcontroller for producing signals based upon the outputs as the warning signals.

18. A vehicle safety system of claim 17, wherein the remote unit further comprises a proximity detector for producing transmission field strength signals, and wherein the remote unit microcontroller is further responsive to the transmission field strength signals from the proximity detector for further producing outputs based upon the transmission field strength signals received.

19. A vehicle safety system of claim 17 further comprising a second remote unit for receiving the wireless transmissions emitted from the local unit and for producing additional warning signals based upon the wireless transmissions received, comprising:
- a receiver responsive to the wireless transmissions emitted from the local unit for producing encoded signals based upon the wireless transmissions received;
- a decoder responsive to the encoded signals from the receiver for producing decoded signals;
- a remote unit microcontroller responsive to the decoded signals from the decoder for producing outputs based upon the decoded signals received; and
- warning signal producing device responsive to the outputs from the remote unit microcontroller for producing signals based upon the outputs as the additional warning signals.

20. A vehicle safety system of claim 19, wherein the second remote unit further comprises a proximity detector for producing transmission field strength signals, and wherein the remote unit microcontroller of the second remote unit is further responsive to the transmission field strength signals from the proximity detector for further producing outputs based upon the transmission field strength signals received.

* * * * *